US011758007B2

(12) United States Patent
Madden

(10) Patent No.: US 11,758,007 B2
(45) Date of Patent: *Sep. 12, 2023

(54) SERVICE PEERING EXCHANGE

(71) Applicant: Equinix, Inc., Redwood City, CA (US)

(72) Inventor: Stephen Anthony Madden, Redwood City, CA (US)

(73) Assignee: Equinix, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/353,310

(22) Filed: Jun. 21, 2021

(65) Prior Publication Data

US 2021/0314411 A1 Oct. 7, 2021

Related U.S. Application Data

(63) Continuation of application No. 16/007,823, filed on Jun. 13, 2018, now Pat. No. 11,044,326.
(Continued)

(51) Int. Cl.
*H04L 67/51* (2022.01)
*H04L 67/104* (2022.01)
(Continued)

(52) U.S. Cl.
CPC .......... *H04L 67/51* (2022.05); *H04L 12/4633* (2013.01); *H04L 67/104* (2013.01); *H04L 67/2871* (2013.01)

(58) Field of Classification Search
CPC ... H04L 67/16; H04L 12/4633; H04L 67/104; H04L 67/2871; H04L 67/26; H04L 69/28; H04L 67/51; H04L 67/55
See application file for complete search history.

(56) References Cited

U.S. PATENT DOCUMENTS 8,345,692 B2 * 1/2013 Smith .................. H04L 12/462
370/396
8,537,845 B2 9/2013 Waldrop et al.
(Continued)

FOREIGN PATENT DOCUMENTS

CN 106464742 A 2/2017
WO 2016183253 A1 11/2016

OTHER PUBLICATIONS

First Office Action and Search Report, and translation thereof, from counterpart Chinese Application No. 201880039255.5 dated Oct. 11, 2021, 17 pp.
(Continued)

*Primary Examiner* — Kevin T Bates
*Assistant Examiner* — Ranjan Pant
(74) *Attorney, Agent, or Firm* — Shumaker & Sieffert, P.A.

(57) ABSTRACT

In general, this disclosure describes a service peering exchange for creating and managing service-to-service paths among applications. For example, a service peering exchange with network connectivity with multiple networks may receive application programming interface (API) data describing APIs for services provided, e.g., by enterprises or cloud service providers (CSPs) and accessible via the networks using service requests. Such services may include, for example, data storage, eCommerce, billing, marketing, customer relationship management (CRM), social media, digital media, financial, weather, search, and other services accessible using machine-to-machine communication over a network. An administrator or customer of the service peering exchange may configure policies that are applied by the service peering exchange to orchestrate service-to-service paths among different services accessible via the different networks.

20 Claims, 8 Drawing Sheets

Related U.S. Application Data

(60) Provisional application No. 62/518,992, filed on Jun. 13, 2017.

(51) Int. Cl.
  H04L 67/2871 (2022.01)
  H04L 12/46 (2006.01)

(56) References Cited

U.S. PATENT DOCUMENTS

| | | | |
|---|---|---|---|
| 9,886,267 | B2 | 2/2018 | Maheshwari et al. |
| 9,887,876 | B2 | 2/2018 | Kumar et al. |
| 10,015,268 | B2 | 7/2018 | Rao |
| 10,116,499 | B2 | 10/2018 | Kumar et al. |
| 10,250,699 | B2 | 4/2019 | Rao |
| 10,742,721 | B1 | 8/2020 | Wagner et al. |
| 10,764,126 | B2 | 9/2020 | Kumar et al. |
| 11,044,326 | B2 | 6/2021 | Madden |
| 2006/0136600 | A1 | 6/2006 | Holdsworth |
| 2008/0209451 | A1* | 8/2008 | Michels .......... G06F 15/16 719/328 |
| 2011/0252154 | A1 | 10/2011 | Bunch et al. |
| 2012/0158821 | A1* | 6/2012 | Barros .......... G06F 9/5055 707/769 |
| 2013/0166710 | A1 | 6/2013 | Miller et al. |
| 2014/0351316 | A1 | 11/2014 | Boubez et al. |
| 2016/0127254 | A1 | 5/2016 | Kumar et al. |
| 2016/0127454 | A1* | 5/2016 | Maheshwari ...... H04L 41/0803 709/223 |
| 2016/0301739 | A1* | 10/2016 | Thompson .......... H04L 67/561 |
| 2016/0337473 | A1* | 11/2016 | Rao .......... H04L 41/20 |
| 2017/0093702 | A1 | 3/2017 | Teng et al. |
| 2020/0396121 | A1 | 12/2020 | Kumar et al. |

OTHER PUBLICATIONS

Office Action from counterpart Canadian Application No. 3,066,459 dated Oct. 29, 2021, 5 pp.
Notice of Intent to Grant and Text Intended to Grant from counterpart European Application No. 18739672.6, dated Oct. 27, 2021, 61 pp.
Rosen et al., "BGP/MPLS IP Virtual Private Networks (VPNs)," Network Working Group, RFC 4364, Feb. 2006, 47 pp.
"TIBCO API Exchange Gateway," TIBCO, Oct. 17, 2014, 3 pp.
International Search Report and Written Opinion of International Application No. PCT/US2018/037389, dated Sep. 18, 2018, 14 pp.
U.S. Appl. No. 16/947,614, filed Aug. 10, 2020, naming inventors Wagner et al.
International Preliminary Report on Patentability from International Application No. PCT/US2018/037389, dated Dec. 26, 2019, 8 pp.
Response to Communication Pursuant to Rules 161(1) and 162 EPC dated Jan. 21, 2020, from counterpart European Application No. 18739672.6, filed Jul. 31, 2020, 95 pp.
First Examination Report from counterpart Australian Patent Application No. 2018285865, dated Jun. 30, 2020, 4 pp.
Office Action issued in Canadian Application No. 3,066,459 dated Feb. 1, 2021, 3 pp.
Response to First Examination Report dated Jun. 30, 2020 from counterpart Australian Patent Application No. 2018285865, filed Jun. 9, 2021, 42 pp.
Prosecution History from U.S. Appl. No. 16/007,823, dated Jan. 27, 2020 through May 26, 2021, 86 pp.
Response to Office Action dated Feb. 1, 2021 issued in Canadian Application No. 3,066,459 filed May 28, 2021, 65 pp.
Notice of Acceptance from counterpart Australian Patent Application No. 2018285865, dated Jul. 8, 2021, 3 pp.
Office Action from counterpart Canadian Application No. 3,066,459 dated Aug. 8, 2022, 4 pp.
Second Office Action and Search Report, and translation thereof, from counterpart Chinese Application No. 201880039255.5 dated Jun. 23, 2022, 9 pp.
Notice of Intent to Grant and Text Intended to Grant from counterpart European Application No. 18739672.6 dated Apr. 19, 2022, 58pp.
Response to Office Action dated Aug. 8, 2022, from counterpart Canada Application No. 3,066,459 filed Dec. 8, 2022, 10 pp.
Examination Report No. 1 from counterpart Australian Application No. 2021254533 dated Oct. 19, 2022, 3 pp.
Extended Search Report from counterpart European Application No. 22190767.8 dated Nov. 22, 2022, 7 pp.
Response to Intent to Grant and Text dated Oct. 27, 2021, from counterpart European Application No. 18739672.6 filed Mar. 1, 2022, 18 pp.
Response to Office Action dated Oct. 29, 2021, from counterpart Canadian Application No. 3,066,459 filed Feb. 28, 2022, 35 pp.
Notice of Intent to Grant from counterpart Canadian Application No. 3,066,459 dated May 3, 2023, 1 pp.
Response to Extended Search Report dated Nov. 22, 2022, from counterpart European Application No. 22190767.8 filed Jul. 3, 2023, 99 pp.

* cited by examiner

SERVICE PEERING EXCHANGE

RELATED APPLICATION

This application is a continuation of U.S. patent application Ser. No. 16/007,823, filed 13 Jun. 2018, which claims the benefit of U.S. Provisional Patent Application No. 62/518,992, filed 13 Jun. 2017, the entire content of each application is incorporated herein by reference.

TECHNICAL FIELD

The disclosure relates to computer networks and, more specifically, to a service peering exchange for creating and managing service-to-service paths between applications provided by computer networks.

BACKGROUND

As digital services become more dominant, such services interact in an automated way to provide connectivity among enterprises. Productized Application Programming Interfaces (APIs) for accessing enterprise services are becoming the new digital storefront, and enterprises commonly deploy API gateways, accessible to the public Internet, to provide a single, controlled, and reliable point of entry to their internal system architectures.

SUMMARY

In general, this disclosure describes a service peering exchange for creating and managing service-to-service paths among applications. For example, a service peering exchange with network connectivity with multiple networks may receive application programming interface (API) data describing APIs for services provided, e.g., by enterprises or cloud service providers (CSPs) and accessible via the networks using service requests. Such services may include, for example, data storage, eCommerce, billing, marketing, customer relationship management (CRM), social media, digital media, financial, weather, search, and other services accessible using machine-to-machine communication over a network. An administrator or customer of the service peering exchange may configure policies that are applied by the service peering exchange to orchestrate service-to-service paths among different services accessible via the different networks.

Based on the policies, the service peering exchange can logically segment shared service bandwidth provided by the service peering exchange and route service requests to appropriate service endpoints. The service peering exchange may also, for some service requests, verify the service requester is authorized and enforce service-level policies before routing the service requests to the service endpoints, in accordance with policies configured for each the destination service endpoints.

Each instance of a service that exchanges service traffic with the service peering exchange exposes a remote API at a network address and transport layer port which may be advertised and available using a service directory, a services layer, and higher layers of the protocol stack. One or more of the services may at least in some cases be accessible via a service gateway (or "API gateway") of the service provider that operates as public interface for the remote APIs at a network address and port of the service gateway. The service peering exchange may include or access a service registry to obtain respective network addresses and ports at which to access the services at the various service endpoints of the multiple service provider networks. The service peering exchange publishes registered, accessible APIs to customers of the service peering exchange and provides network-layer and higher-layer connectivity for customers to the APIs at a network address and ports of the service peering exchange accessible to the customers on an access link.

In some examples, to route service requests received the network address and ports of the service peering exchange to the appropriate service endpoints, the service peering exchange performs service-level mapping and proxies the service sessions between (i) the requesting application and the service peering exchange and (ii) the service peering exchange and the service endpoints. In some examples, the service peering exchange may have connectivity with a cloud exchange or other network services exchange that enables one-to-many connectivity between the service peering exchange and the networks that host the services. In some examples, to route service requests, the service peering exchange applies policies to permit bridging (i.e., forwarding at layer 2) of service requests to the service endpoints that are visible at the network layers (layer 2/layer 3) to requesting applications. In some examples, the service peering exchange may orchestrate service chains for services by routing service requests in accordance with one or more policies.

The service peering exchange techniques described herein may have one or more technical advantages. For example, by proxying service sessions or bridging communications, the service peering exchange may allow multiple applications to exchange service requests and responses without requiring any dedicated, direct network-layer connectivity between networks that execute the service instances communicating with one another. In this way, the service peering exchange may replace interconnected networks such that customer networks may remain unconnected with one another other, except via the service peering exchange and only for service traffic. This may avoid a need for customers to purchase or otherwise establish direct or virtual connectivity among customers using cross-connects or virtual connections such as virtual private networks or virtual circuits of a cloud exchange, Internet exchange, or Ethernet exchange. Reducing or eliminating direct or virtual connectivity among customers may facilitate lower-latency service traffic and may simplify the configuration of and reduce a load upon networks by reducing resources and/or resource utilization typically needed to facilitate such network connectivity, such as network links, firewalls, memory resources of network devices, and so forth. The service peering gateway may also provide a centralized location for multiple service endpoints to perform endpoint-specific (or at least customer-specific) requester verification, security and packet inspection, policy enforcement at the API level, data collection and analytics.

In one example, a method includes receiving, by a service peering exchange executed by one or more computing devices and at a first service exchange endpoint of the service peering exchange, a first incoming service request from a first customer network, wherein the first incoming service request is destined to the first service exchange endpoint, and wherein the first incoming service request can invoke an application programming interface of a first application; outputting, by the service peering exchange in response to receiving the first incoming service request, a first outgoing service request destined to a service endpoint of a second customer network that executes the first application, wherein the first outgoing service request can invoke the application programming interface of the first application; receiving, by the service peering exchange and at a second service exchange endpoint of the service peering exchange that is different than the first service exchange endpoint, a second incoming service request from the first customer network, wherein the second incoming service request is destined to the second service exchange endpoint, and wherein the second incoming service request can invoke an application programming interface of a second application; and outputting, by the service peering exchange in response to receiving the second incoming service request, a second outgoing service request destined to a service endpoint of a third customer network that executes the second application, wherein the second outgoing service request can invoke the application programming interface of the second application.

In another example, a service exchange system comprises one or more service peering exchanges configured for execution by a service peering exchange platform comprising one or more computing devices; and a service gateway for an application configured for execution by the first customer network, the service gateway configured for execution by a computing device of the first customer network, wherein the one or more service peering exchanges are configured to receive, at a service exchange endpoint, an incoming service request from a second customer network, wherein the incoming service request is destined to the service exchange endpoint, and wherein the incoming service request can invoke an application programming interface of the application configured for execution by the first customer network, wherein the one or more service peering exchanges are configured to, in response to receiving the incoming service request, output an outgoing service request destined to a service endpoint of the service gateway, wherein the outgoing service request can invoke the application programming interface of the application configured for execution by the first customer network, wherein the service gateway is configured to receive the second service request at the service endpoint and route the second service request to the application.

In another example, a service exchange system comprises one or more service peering exchanges configured for execution by a service peering exchange platform comprising one or more computing devices, wherein the one or more service peering exchanges are configured to receive, at a first service exchange endpoint, a first incoming service request from a first customer network, wherein the first incoming service request is destined to the first service exchange endpoint, and wherein the first incoming service request can invoke an application programming interface of a first application, wherein the one or more service peering exchanges are configured to output, in response to receiving the first incoming service request, a first outgoing service request destined to a service endpoint of a second customer network that executes the first application, wherein the first outgoing service request can invoke the application programming interface of the first application, wherein the one or more service peering exchanges are configured to receive, at a second service exchange endpoint that is different than the first service exchange endpoint, a second incoming service request from the first customer network, wherein the second incoming service request is destined to the second service exchange endpoint, and wherein the second incoming service request can invoke an application programming interface of a second application, and wherein the one or more service peering exchanges are configured to output, in response to receiving the second incoming service request, a second outgoing service request destined to a service endpoint of a third customer network that executes the second application, wherein the second outgoing service request can invoke the application programming interface of the second application.

The details of one or more examples are set forth in the accompanying drawings and the description below. Other features, objects, and advantages will be apparent from the description and drawings, and from the claims.

BRIEF DESCRIPTION OF DRAWINGS

Like reference characters denote like elements throughout the figures and text.

DETAILED DESCRIPTION

Figure 1:
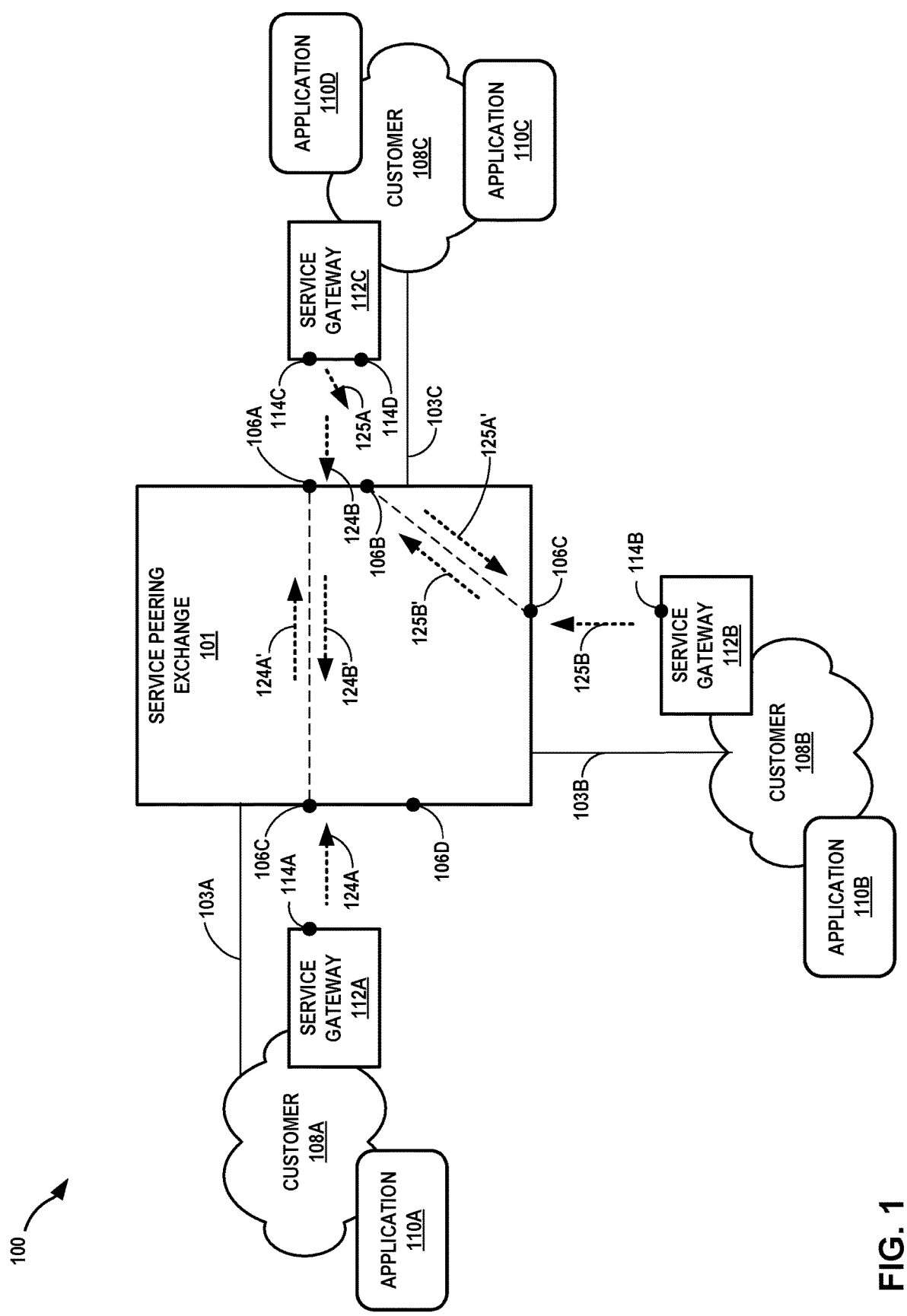
FIG. 1 is a block diagram illustrating an example service exchange system for creating and managing service-to-service paths among applications accessible at multiple different service endpoints, in accordance with techniques of this disclosure.

FIG. 1 is a block diagram illustrating an example service exchange system for creating and managing service-to-service paths among applications accessible at multiple different service endpoints, in accordance with techniques of this disclosure. Service exchange system 100 includes multiple customer networks 108A-108C (collectively, "customer networks 108") for respective customers of a provider of service peering exchange 101.

Each of customer networks 108 may represent one of an enterprise network; a cloud service provider network; a private, public, or hybrid cloud network; and a tenant network within a cloud network, for example. Each of customer networks 108 is a layer 3 network and may include one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

Each of customer networks 108 includes one or more host servers (not shown) that each executes an instance of at least one of applications 110A-110D (collectively, "applications 110"). For example, one or more host servers of customer network 108A each executes a service instance of application 110A, and the service instance processes service requests received at the network address and port of the host server assigned to the service instance. As another example, one or more host servers of customer network 108C each executes a service instance of application 110C and/or a service instance of application 110D.

Host servers may include compute servers, storage servers, application server, or other computing device for executing applications that process service requests received via a network. Hosts servers may represent real servers or virtual servers, such as virtual machines, containers, or other virtualized execution environment.

Applications 110 offer services, such as data storage, eCommerce, billing, marketing, customer relationship management (CRM), social media, digital media, financial, weather, search, and other services accessible using machine-to-machine communication over the corresponding customer network 108. Each of applications 110 may represent a different service. Each service instance hosted by a host server exposes a remote application programming interface (API) at a network address and port of the host server. The combination of network address and port mapped to a service instance executed by a host server is referred to as a "service endpoint" and, more specifically in this example where the service instances are logically situated behind service gateways 112, an "internal service endpoint." For example, a service instance of application 110D processes service requests received at a network address and port of the host server that executes the service instance, the service requests conforming to the API of the application 110D. Service requests may alternatively be referred to as "API requests."

Services offered by applications 110 may alternatively be referred to as "web services" in that the services communicate with other computing devices' web services, application, and messaging protocols, and other emerging protocols developed at least in part for the world-wide web, such as HyperText Transfer Protocol (HTTP) or Simple Mail Transfer Protocol (SMTP), and operating over Internet Protocol networks. The services may operate in accordance with different service frameworks, such as Apache Axis, Java Web Services, Windows Communication Foundation (WCF), and .NET Framework, each of which makes use of one or more web service protocols to communicate service data between machines. Example web service protocols include JavaScript Object Notation (JSON)-Remote Procedure Call (RPC), Representational State Transfer (REST)ful services, Simple Object Access Protocol (SOAP), Apache Thrift, eXtensible Markup Language (XML)-RPC, Message Queue Telemetry Transport (MQTT), Rabbit Message Queue (RabbitMQ), and Constrained Application Protocol (CoAP), and Web Services Description Language (WSDL).

In this example, administrators of customer networks 108 deploy respective service gateways 112 to the customer networks to expose internal APIs of service instances to clients external to the customer networks. For example, service gateway 112A of customer network 108A operates as a single point of entry for the one or more service instances of application 110A and is responsible for service request routing to the service instances. That is, service gateway 112A routes service requests received at the service gateway 112 to target services offered by the one or more service instances of application 110A. Service gateway 112A may represent a server computing device executing a service gateway application. Service gateway 112A may represent a pool of service gateway instances ("gateway pool") accessible at one or more service endpoints. Service gateway 112A may be instantiated by a corresponding customer that creates one or more network function virtualization (NFV) instances of a service gateway function. The customer may register the NFV instances with the service peering exchange 101 subsequent to instantiating them. Service gateway 112A has a network address and may receive the service requests for routing at a transport-layer port, such as port 80 or 8080 for HTTP-based service requests, although any suitable transport-layer port may be mapped by the service gateway to a service. The combination of the network address and port for the service gateway application is a service endpoint 114A for the services exposed by the service gateway 112A. Service gateway 112B, 112C may be deployed and operate similarly to service gateway 112A as described above. Thus, service gateway 112B includes service endpoint 114B at which the service gateway 112B receives service requests for application 110B, and service gateway 112C includes service endpoints 114C, 114D at which the service gateway 112C receives service requests for applications 110C and 110D.

As used herein, the term "routing" and similar terms for delivering service requests to an intended destination may include layer 2/layer 3 forwarding but may include, in addition or in the alternative, the application of policies to identify, approve, and output service requests to their intended destinations in accordance with service protocols for the service requests. The output service requests may be routed in their original or in a modified form, e.g., to direct the service requests from a received service exchange endpoint to a service endpoint of application, which may be reachable via a service endpoint of a service gateway.

Besides routing service requests between requesters (i.e., issuers of service requests) and internal service endpoints, each of service gateways 112 may also verify requesters are authorized to make requests, prevent access to internal service endpoints by unauthorized requesters, perform load balancing among multiple service instances for the applications 110, throttle service requests, and/or translate web service protocols of received service requests to other web service protocols (e.g., transform RESTful protocols to SOAP) prior to routing the service requests, for example. Each of service gateways 112 may use a service discovery mechanism to identify internal service endpoints for a service offered by an application 110, and route service requests for the service to the internal service endpoints. Example service discovery mechanisms include client-side discovery and server-side discovery. Service gateways 112, in this manner, offer external APIs for reaching the internal service endpoints for applications 110.

Service discovery may occur at the service layer, for the service layer typically describes and offers business capabilities and services for services offered in conformity to one or more web service protocols. Services offered by applications 110 for corresponding customers 108 are associated with service endpoints 114. Service discovery information obtained by the service peering exchange 101 and advertised to service gateways 112, for service discovery by service gateways 112, may be stored by service peering exchange 101 in association with the service endpoints.

Customer networks 108 are coupled to a service peering exchange 101 by respective communication links 103A-103C (collectively, "communication links 103"). Customer networks 108 and service peering exchange 101 exchange data communications via communication links 103, each of which may represent at least one Ethernet link, Asynchronous Transfer Mode (ATM) link, and SONET/SDH link, for example. Communication links 103 may each represent a layer 2 network, such as a local area network or virtual local area network (VLAN). Data communications may conform to the Open System Interconnection (OSI) model, Transmission Control Protocol (TCP)/Internet Protocol (IP) model, or User Datagram Protocol (UDP)/IP model. Data communications may include a layer 3 (i.e., network layer) packet having an Internet Protocol header that includes source and destination network addresses and layer 4 (e.g., transport layer protocol, such as TCP/UDP) source and destination ports. The Internet Protocol header also specifies the transport layer protocol for the data communication.

Customer networks 108 may not have network connectivity with one another. That is, a device in customer network 108A may be unable to send a network (layer 3) packet to a device in customer network 108B or to a device in customer network 108C, for there is no physical or virtual network configured to route network packets between the customer networks 108. In some cases, customer networks 108 may have network connectivity to one another only via communication links other than communication links 103.

Service peering exchange 101 obtains, e.g., using service discovery, service endpoint data describing service endpoints 114 for APIs exposed by service gateways 112. Service endpoint data may include network address and port information for the service endpoints 114. Service peering exchange 101 may perform service discovery to obtain the service endpoint data from service registries for the service gateways, for example, such as by sending service discovery messages to the service gateways. Service peering exchange 101 may further obtain API description data for the APIs exposed by the service gateways 112 at service endpoints 114. API description data may describe protocols, methods, API endpoints, etc., that define acceptable service requests for the service endpoints for interacting with the services for applications 110. API description data may be formatted with WSDL.

In accordance with techniques described in this disclosure, service peering exchange 101 enables inter-service communication among applications 110 executed by different customer networks 108 by creating and managing service-to-service paths between the applications. In this example, service peering exchange 101 enables service exchange endpoints 106 for sending and receiving service traffic with customer networks 108. As used herein, "service traffic" may refer to service requests invoking application programming interfaces of service instances, as well as responses to such service requests (or "service responses").

Each service exchange endpoint 106 is a network address and port pair that is internally mapped, by the service peering exchange 101 using service mapping data, to one of service endpoints 114 for services provided by applications 110 executing by customer networks 108. Service peering exchange 101 receives service requests issued, e.g., by applications 110 at service exchange endpoints 106. Service peering exchange 101 outputs, in response, corresponding service requests directed to the service endpoint 114, on a different customer network 108, to which the destination service exchange endpoints 106 are mapped. In this way, service peering exchange 101 enables service-to-service communication between applications executing by customer networks 108 that do not have a dedicated, directly network-layer connection with one another. Service mapping data may be obtained by service peering exchange 101 in real-time by performing service mapping resolution for load balancing service requests among service gateways/applications that are members of a pool.

In the example of FIG. 1, service peering exchange 101 maps service exchange endpoints 106A-106D to respective service endpoints 114A-114D of multiple customer networks 108, in this example the service endpoints 114 being accessible at service gateways 112. For example, service peering exchange 101 maps service exchange endpoint 106A exposed by the service peering exchange 101 to service endpoint 114A exposed by service gateway 112A of customer network 108A and usable for accessing the API of application 110A. Service peering exchange 101 maps service exchange endpoint 106B exposed by the service peering exchange 101 to service endpoint 114B exposed by service gateway 112B of customer network 108B and usable for accessing the API of application 110B. Service peering exchange 101 maps service exchange endpoints 106C, 106D exposed by the service peering exchange 101 to service endpoints 114C, 114D exposed by service gateway 112C of customer network 108C and usable for accessing the APIs of applications 110C, 110D. Consequently, and as described in further detail below, service peering exchange 101 enables applications 110B-110D executing by customer networks 108B, 108C to issue service requests to application 110A, despite customer networks 108 not having network connectivity to one another.

Service peering exchange 101 receives a service request 124A from customer network 108A. Service request 124A has a destination network address and destination port that match the network address and port of service exchange endpoint 106C. The service request 124A may conform to a web service protocol, such as any of the web service protocols listed above. For example, service request 124A may represent a REST communication using HTTP, a SOAP communication, or another type of service request that can invoke an API for application 110C. That is, service instances of the application 110C would recognize the service request 124A as a service request that invokes the API for application 110C. Service request 124A may be generated by a service instance of application 110A and output from a computing device of customer network 108C that executes the service instance. Service request 124A includes service data for invoking an API offered by a service instance of application 110C.

Service peering exchange 101 maps the service request 124A received at service exchange endpoint 106C to service endpoint 114C and generates a new outgoing service request 124A'. Outgoing service request 124A' includes service data from service request 124A and includes a layer 4 header and a layer 3 header that causes the outgoing service request 124A' to be received at service endpoint 114C exposed by service gateway 112C. In other words, service peering exchange 101 rewrites at least the destination network address and destination port of the service request 124A, which is destined to service exchange endpoint 106C, to generate and output outgoing service request 124A', which is destined to service endpoint 114C. Service peering exchange 101 may also generate the outgoing service request 124A' to have a source service endpoint as service exchange endpoint 106A mapped by service peering exchange 101 to service endpoint 114A. Service peering exchange 101 outputs the outgoing service request 124A' via communication link 103C. Service gateway 112C receives the outgoing service request 124A' at the service endpoint 114C. Service peering exchange 101 may proxy a transport-layer (e.g., TCP) session between service peering exchange 101 and a service instance of application 110A and a transport-layer session between service peering exchange 101 and a service instance of application 110C. In this way, service peering exchange 101 creates a service-to-service path for service requests and service responses between a service instance for application 110A and a service instance for application 110C, despite customer networks 108 not having inter-network connectivity.

Service gateway 112C sends the outgoing service request 124A' for processing by a service instance of application 110C. In some cases, the service gateway 112C may generate a new outgoing service request 124A' with a layer 4 header and a layer 3 header having a destination port and a destination address for the service instance of application 110C. The service instance of application 110C may output a new service request 125A for application 110B executing by customer network 108B. Service request 125A is destined for service exchange endpoint 106B of service peering exchange 101. Service peering exchange 101 receives service request 125A at service exchange endpoint 106B. Service peering exchange 101 maps the service request 125A at service exchange endpoint 106B to service endpoint 114B and generate a new outgoing service request 125A'. To generate new outgoing service request 125A', the service peering exchange 101 may apply operations similar to those expressed above for generating outgoing service request 124A'. Service peering exchange 101 outputs outgoing service request 125A' via communication link 103B. Service gateway 112C receives the outgoing service request 125A' at the service endpoint 114C. Service peering exchange 101 may proxy a transport-layer session between service peering exchange 101 and a service instance of application 110C and a transport-layer session between service peering exchange 101 and a service instance of application 110B.

Service gateway 112B sends the outgoing service request 125A' for processing by a service instance of application 110B. In some cases, the service gateway 112B may generate a new outgoing service request 125A' with a layer 4 header and a layer 3 header having a destination port and a destination address for the service instance of application 110B. The service instance of application 110B processes outgoing service request 125A' and may generate a service response 125B destined for service exchange endpoint 106C that is indicated as a source service endpoint for service request 125.

Service peering exchange 101 receives service response 125B at service exchange endpoint 106C and generates outgoing service response 125B' based on the mapping of service exchange endpoint 106C to service endpoint 114C. Outgoing service response 125B' is therefore destined for service endpoint 114C. Service peering exchange 101 outputs outgoing service response 125B' via communication link 103C to customer network 108C. Service gateway 112C receives outgoing service response 125B' at service endpoint 114C and directs outgoing service response 125B' to service instance of application 110C. The service instance of application 110C processes outgoing service response 125B'.

The service instance of application 110C may generate service response 124B responsive to outgoing service request 124A'. Service response 124B is destined for service exchange endpoint 106A based on the source endpoint indicated by outgoing service request 124A'. Service peering exchange 101 receives service response 124B at service exchange point 106A and generates service response 124B' based on the mapping of service exchange endpoint 106A to service endpoint 114A. Service response 124B' is therefore destined for service endpoint 114A. Service peering exchange 101 outputs service response 124B' via communication link 103A to customer network 108A. Service gateway 112A receives service response 124B' at service endpoint 114A and directs service response 124B' to service instance of application 110A. The service instance of application 110A processes service response 124B'.

In some examples, each of service gateways 112 exposes its registered APIs and corresponding service endpoints 114 with service peering exchange 101. Service gateway 112A may register APIs accessible at service endpoint 114A, service gateway 112B may register APIs accessible at service endpoint 114B, and service gateway 112C may register APIs accessible at service endpoints 114C and 114D, for example. In some cases, a customer that operates each gateway 112 may register the APIs and service endpoints 114 via a portal application, such as customer portal 330 described below with respect to FIGS. 2A-2B. Service endpoints and service exchange endpoints may be indicated in part using Uniform Resource Locators (URLs) or Uniform Resource Identifiers, in part using transport-layer ports, or by explicitly specifying a network address and transport-layer port for the service endpoint, for example. As mentioned above, service peering exchange 101 may use service discovery to obtain service endpoints 114 for APIs of service gateways 112. Service peering exchange 101 may publish the endpoints 114 to customers for customer networks 108, along with the APIs, in an API catalog that is accessible, for instance, via a portal deployed by a provider of the service peering exchange 101. In some examples, the service peering exchange 101 (or a customer portal for the service peering exchange such as portal 330), outputs an indication of accessibility of application programming interfaces at service exchange points. For example, service peering exchange 101 maps the registered endpoints 114 to service exchange endpoints 106 and publishes endpoints 106 to customers for customer networks 108, along with the APIs, in an API catalog. Applications 110 and service gateways 112 may consequently direct service requests for the APIs to service exchange endpoints 106 of the service peering exchange 101, which thereby impersonates the service gateways 112 using service exchange endpoints 106 to receive service requests ultimately destined for applications 110 behind service endpoints 114.

Applications 110 may perform service discovery to identify service exchange endpoints 106 for accessing service endpoints 114 via service peering exchange 101. Service discovery may occur at the service layer. Service peering exchange 101 may expose a discovery API, e.g., using a discovery Uniform Resource Locator (URL), in order to enable such service discovery by applications 110. For example, application 110A may invoke the discovery API using a discovery request message that includes a parameter value that indicates application 110C. Service peering exchange 101 provides a discovery response message that includes the network address and port for service exchange endpoint 106C that is mapped by the service peering exchange 101 to service endpoint 114C. Consequently, application 110A may direct service requests to service exchange endpoint 106C for delivery by service peering exchange 101 to service endpoint 114C exposed by service gateway 112C using techniques described above.

The service peering techniques enables the service peering exchange 101 to receive and route service requests to appropriate service endpoints 114 for respective applications 110 executing by multiple different customer networks 108, despite such networks not having dedicated network connectivity with one another, at least in some cases. In this way, the service peering exchange 101 may replace an interconnecting network such that customer networks 108 may remain unconnected with one another, except via the service peering exchange 101 and only for service traffic, and thereby avoid the requirement for customers that deploy customer networks 108 to purchase or otherwise establish direct or virtual connectivity among customer networks 108 using cross-connects or virtual connections such as virtual private networks. In effect, the service peering exchange 101 substantially abstracts the networks by providing service request routing among inter-customer networks 108 and service segmentation between service gateways 112 according to access authorizations among the applications 110.

Moreover, the service peering exchange 101 may provide a neutral service for customers to peer API services between one another. As business processes become more fluid and interlaced in business ecosystems, customers may bundle and share services in flows. The flow of service requests 124 and 125 from customer network 108A to customer 108B via customer 108C is an example of such a flow. Each service may belong to a different organizational entity (and the digital service component the entity provides), and the flow may represent a new joint business offering. The service peering exchange 101 offers a layered service as the intersection point of digital business-to-business transactions among two or more customers that have deployed respective customer networks 108. As described in further detail below, the service peering exchange 101 may be deployed to a services exchange, such as a cloud exchange or Internet exchange, and become an open digital business exchange for tenants having access to the services exchange or otherwise having applications executed by networks having access to the service exchange. In some cases, one or more tenant customers are directly colocated with the services exchange by deploying network and computing equipment for customer networks 108 within a physical data center housing the services exchange. One or more tenant customer may also or alternatively be indirectly connected to the services exchange via a network service provider colocated within the physical data center and connected to the services exchange.

Figure 2A:
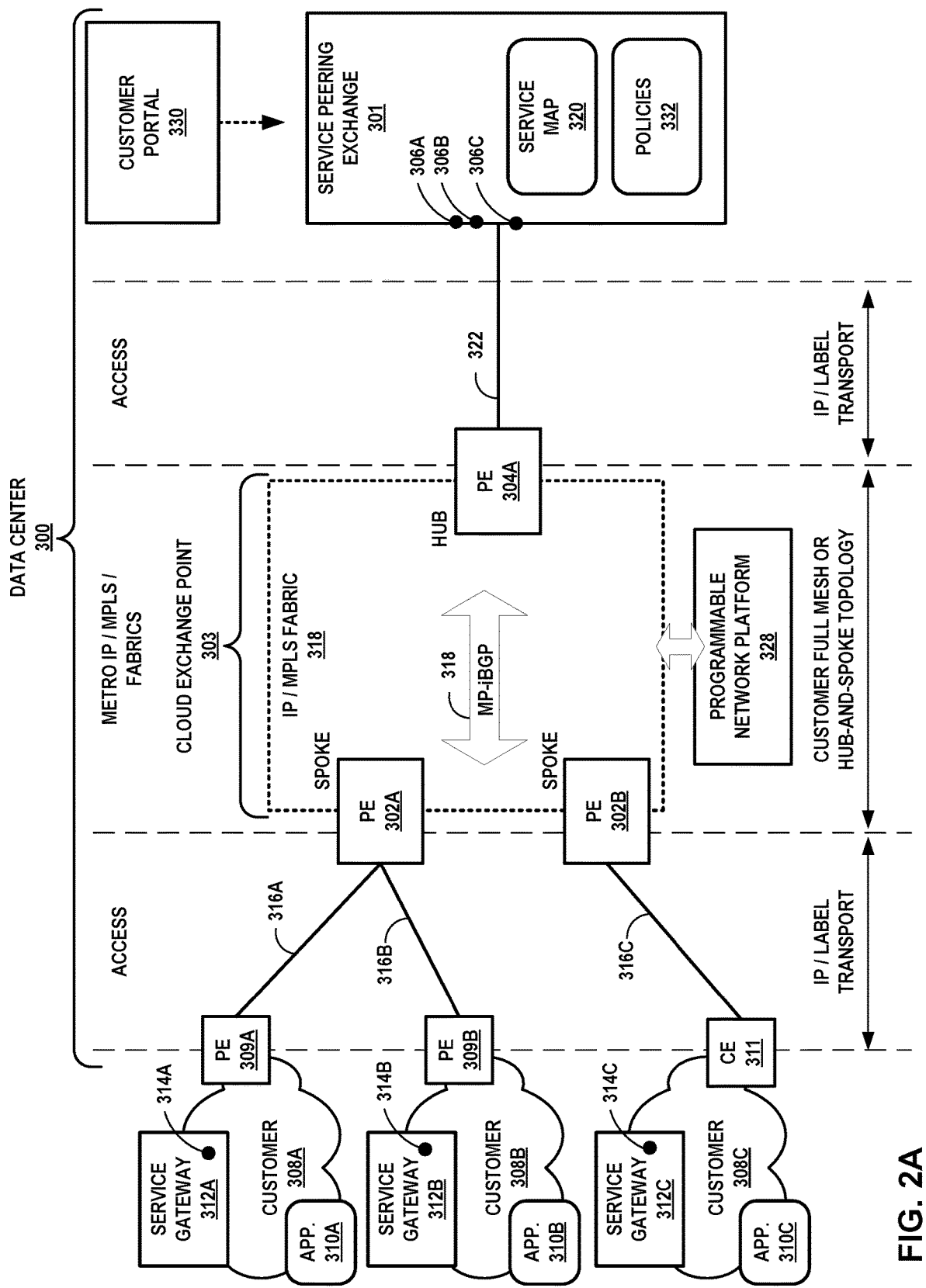
FIGS. 2A-2B are block diagrams illustrating an example cloud exchange point that is configurable by a programmable network platform to establish network connectivity between a service peering exchange and multiple customer networks to enable service-to-service communication between applications executing by the customer networks, according to techniques of this disclosure.
Figure 2B:
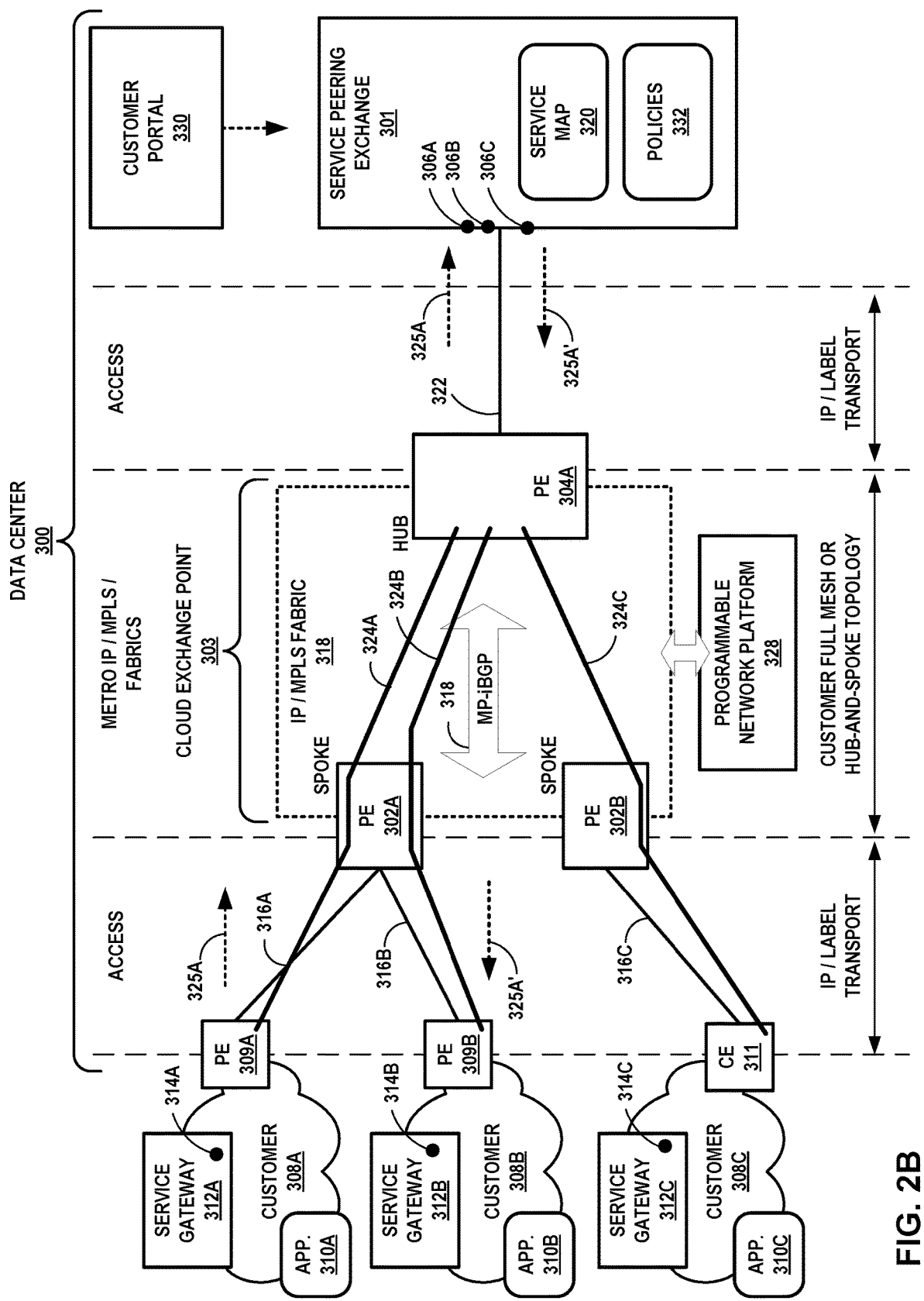

FIGS. 2A-2B are block diagrams illustrating an example cloud exchange point that is configurable by a programmable network platform to establish network connectivity between a service peering exchange and multiple customer networks to enable service-to-service communication between applications executing by the customer networks, according to techniques of this disclosure. Cloud exchange point 303 is an example implementation of a software-defined networking (SDN)-controlled or software-defined wide area networking (SD-WAN)-controlled network switch fabric in which a controller (in this example, programmable network platform 328) manages the network configuration for the network to facilitate connectivity among customer networks 308 and the service peering exchange 301. Cloud exchange point 303, customer networks 308, and service peering exchange 301 may represent an example instance of a service exchange system 100. Customer networks 308 may represent example customer networks 108, applications 310 may represent example applications 110, service gateways 312 may represent example service gateways 112, service endpoints 314 may represent example service endpoints 114, and service peering exchange 301 may represent an example service peering exchange 101.

Customer networks 308A-308C (collectively, "customer networks 308"), each associated with a different customer of the provider of cloud exchange point 303, access a cloud exchange point 303 within a data center 300 in order receive aggregated services from one or more other networks coupled to the cloud exchange point 303. Customer networks 308 each include endpoint devices that provide and/or consume services. Example endpoint devices include real or virtual servers, smart phones, television set-top boxes, workstations, laptop/tablet computers, video gaming systems, teleconferencing systems, media players, and so forth.

Customer networks 308A-308B include respective provider edge/autonomous system border routers (PE/ASBRs) 309A-309B. Each of PE/ASBRs 309A, 309B may execute exterior gateway routing protocols to peer with one of PE routers 302A-302B ("PE routers 302" or more simply "PEs 302") over one of access links 316A-316B (collectively, "access links 316"). In the illustrated examples, each of access links 316 represents a transit link between an edge router of a customer network 308 and an edge router (or autonomous system border router) of cloud exchange point 303. For example, PE 309A and PE 302A may directly peer via an exterior gateway protocol, e.g., exterior BGP, to exchange L3 routes over access link 316A and to exchange L3 data traffic between customer network 308A and cloud service provider networks 320. Access links 316 may in some cases represent and alternatively be referred to as attachment circuits for IP-VPNs configured in IP/MPLS fabric 318, as described in further detail below. Access links 316 may in some cases each include a direct physical connection between at least one port of a customer network 308 and at least one port of cloud exchange point 303, with no intervening transit network. Access links 316 may operate over a VLAN or a stacked VLAN (e.g, QinQ), a VxLAN, an LSP, a GRE tunnel, or other type of tunnel.

While illustrated and primarily described with respect to L3 connectivity between customer networks 308 and service peering exchange 301, PE routers 302 may additionally or alternatively offer, via access links 316, L2 connectivity between customer networks 308 and service peering exchange 301. For example, a port of PE router 302A may be configured with an L2 interface that provides, to customer network 308A, L2 connectivity to service peering exchange 301 via access link 316A, with the service peering exchange 301 coupled (either directly or via another network device) to a port of PE router 304A that is also configured with an L2 interface. The port of PE router 302A may be additionally configured with an L3 interface that provides, to customer network 308A, L3 connectivity to cloud service provider 320B via access links 316A. PE 302A may be configured with multiple L2 and/or L3 sub-interfaces such that customer 308A may be provided, by the cloud exchange provider, with a one-to-many connection to service peering exchange 301 and one or more other network coupled to the cloud exchange point 303.

To create an L2 interconnection between a customer network 308 and a service peering exchange 301, in some examples, IP/MPLS fabric 318 is configured with an L2 bridge domain (e.g., an L2 virtual private network (L2VPN) such as a virtual private LAN service (VPLS), E-LINE, or E-LAN) to bridge L2 traffic between a customer-facing port of PEs 302 and a service peering exchange-facing port of 304A. In some cases, service peering exchange 301 and one or more customer networks 308 may have access links to the same PE router 302, 304, which bridges the L2 traffic using the bridge domain. To create an L3 interconnection between a customer network 308 and the service peering exchange 301, in some examples, IP/MPLS fabric 318 is configured with a L3 virtual routing and forwarding instances (VRFs).

In some examples of a cloud exchange point 303, any of access links 316 and aggregation links 322 may represent Network-to-Network Interface (NNI) links. Additional details of NNI links and provisioning of NNI links to facilitate layer 2 connectivity within a data center 300 are found in U.S. Pat. No. 8,537,845, issued Sep. 17, 2013, and entitled "Real time configuration and provisioning for a carrier Ethernet exchange," which is incorporated by reference herein in its entirety.

In this example, customer network 308C is not an autonomous system having an autonomous system number. Customer network 308C may represent an enterprise, network service provider, or other customer network that is within the routing footprint of the cloud exchange point. Customer network includes a customer edge (CE) device 311 that may execute exterior gateway routing protocols to peer with PE router 302B over access link 316C. In various examples, any of PEs 309A-309B may alternatively be or otherwise represent CE devices. Customer networks 308A-308B may or may not be autonomous systems having an autonomous system number.

Access links 316 include physical links and may include one or more intermediate switching devices. PE/ASBRs 309A-309B, CE device 311, and PE routers 302A-302B exchange L2/L3 packets via access links 316. In this respect, access links 316 constitute transport links for cloud access via cloud exchange point 303.

Cloud exchange point 303, in some examples, aggregates customers 308 access to the cloud exchange point 303 to other networks coupled to the cloud exchange point 303. FIGS. 2A-2B, e.g., illustrate access links 316A-316B connecting respective customer networks 308A-308B to PE router 302A of cloud exchange point 303 and access link 316C connecting customer network 308C to PE router 302B. Any one or more of PE routers 302, 304 may comprise ASBRs. PE routers 302, 304 and IP/MPLS fabric 318 may be configured according to techniques described herein to interconnect any of access links 316 to access link 322. As a result, cloud service provider network 320A, e.g., needs only to have configured a single cloud aggregate link (here, access link 322A) in order to provide services to multiple customer networks 308. That is, the cloud service provider operating cloud service provider network 302A does not need to provision and configure separate service links from service peering exchange 303 to PE routers 309, 311, for instance, in order to provide services to each of customer network 308. Cloud exchange point 303 may instead interconnect access link 322 coupled to PE 304A and service peering exchange 301 to multiple cloud access links 316 to provide layer 3 peering and network reachability for the service traffic between any of customer networks 308 and service peering exchange 301.

In addition, a single customer network, e.g., customer network 308A, need only to have configured a single cloud access link (here, access link 316A) to the cloud exchange point 303 within data center 300 in order for service peering exchange 301 to provide services peering to customer networks 308 also coupled to cloud exchange point 303. That is, the operator of service peering exchange 301 does not need to provision and configure separate service links connecting service peering exchange 301 in order to provide service peering to multiple customer networks 308. Cloud exchange point 303 may instead interconnect each of cloud access links 316A-316B (again, as one example) to access link 322 to provide layer 3 peering and network reachability for the cloud services delivery to customer networks 308A-308C.

In some cases, service peering exchange 301 may be coupled to a PE router (not shown) that is coupled to access link 322. The PE router may execute an exterior gateway routing protocol, e.g., eBGP, to exchange routes with PE router 304A of cloud exchange point 303.

In the illustrated example, an Internet Protocol/Multiprotocol label switching (IP/MPLS) fabric 318 interconnects PEs 302 and PE 304A. IP/MPLS fabric 318 include one or more switching and routing devices, including PEs 302, 304A, that provide IP/MPLS switching and routing of IP packets to form an IP backbone. In some example, IP/MPLS fabric 318 may implement one or more different tunneling protocols (i.e., other than MPLS) to route traffic among PE routers and/or associate the traffic with different IP-VPNs. In accordance with techniques described herein, IP/MPLS fabric 318 implement IP virtual private networks (IP-VPNs) to connect any of customers 308 with service peering exchange 301 to provide a data center-based 'transport' and layer 3 cross-connect. Whereas service provider-based IP backbone networks require wide-area network (WAN) connections with limited bandwidth to transport service traffic from layer 3 services providers to customers, the cloud exchange point 303 as described herein 'transports' service traffic and interconnects service peering exchange 301 to customers 308 within the high-bandwidth local environment of data center 300 provided by a data center-based IP/MPLS fabric 318. In some examples, IP/MPLS fabric 318 implements IP-VPNs using techniques described in Rosen & Rekhter, "BGP/MPLS IP Virtual Private Networks (VPNs)," Request for Comments 4364, February 2006, Internet Engineering Task Force (IETF) Network Working Group, the entire contents of which is incorporated by reference herein. In some example configurations, a customer network 308 and service peering exchange 301 may connect via respective links to the same PE router of IP/MPLS fabric 318.

Access links 316 and access link 322 may include attachment circuits that associate traffic, exchanged with the connected customer network 308 or service peering exchange 301, with virtual routing and forwarding instances (VRFs) configured in PEs 302, 304A and corresponding to IP-VPNs operating over IP/MPLS fabric 318. For example, PE 302A may exchange IP packets with PE 310A on a bidirectional label-switched path (LSP) operating over access link 316A, the LSP being an attachment circuit for a VRF configured in PE 302A. As another example, PE 304A may exchange IP packets with a PE device or network switch for service peering exchange 301 on a bidirectional label-switched path (LSP) or VLAN operating over access link 322, the LSP or VLAN being an attachment circuit for a VRF configured in PE 304A. Each VRF may include or represent a different routing and forwarding table with distinct routes.

PE routers 302, 304 of IP/MPLS fabric 318 may be configured in respective hub-and-spoke arrangements for cloud services, with PE 304A implementing a hub and PEs 302 being configured as spokes of the hubs (for various hub-and-spoke instances/arrangements). A hub-and-spoke arrangement ensures that service traffic is enabled to flow between a hub PE and any of the spoke PEs, but not between different spoke PEs. Hub-and-spoke VPNs may in this way enable complete separation between customer networks 308. As described further below, in a hub-and-spoke arrangement for data center-based IP/MPLS fabric 318 and for customer-bound service traffic (i.e., from service peering exchange 301 to a customer network 308) PEs 302 advertise routes, received from PEs 309, 311, to PE 304A. For service peering exchange-bound service traffic (i.e., from a customer network 308 to service peering exchange 301), PE 304A advertises routes for service peering exchange 301 to PEs 302, which advertise the routes to PEs 309, CE 311. As used herein, a hub VRF exports routes having an "up" route target (RT) while a spoke VRF imports routes having an "up" route target. Conversely, a spoke VRF exports routes having a "down" route target while a hub VRF imports routes having a "down" route target. In some examples, each VRF instance has a unique route distinguisher (RD).

For some customers of cloud exchange point 303, the provider of cloud exchange point 303 may configure a full mesh arrangement whereby a set of PEs 302, 304A each couples to a different customer site network for the customer. In such cases, the IP/MPLS fabric 318 implements a layer 3 VPN (L3VPN) for cage-to-cage or redundancy traffic (also known as east-west or horizontal traffic). The L3VPN may effectuate a closed user group whereby each customer site network can send traffic to one another but cannot send or receive traffic outside of the L3VPN.

In some examples, PE routers may couple to one another according to a peer model without use of overlay networks. That is, PEs 309, CE 311 and a network for service peering exchange 301 may not peer directly with one another to exchange routes, but rather indirectly exchange routes via IP/MPLS fabric 318. In the example of FIG. 2B, programmable network platform 328 configures cloud exchange point 303 to implement multiple virtual circuits 324A-324C (collectively, "virtual circuits 324") for interconnecting customer network 308 and service peering exchange 301 with end-to-end IP paths. Each of service peering exchange 301 and customers 308 may be an endpoint for multiple virtual circuits 324, with multiple virtual circuits 324 traversing one or more attachment circuits between a PE/PE or PE/CE pair for the IP/MPLS fabric 318 and the customer or service peering exchange 301. A virtual circuit 324 may represent a layer 3 path through IP/MPLS fabric 318 between an attachment circuit connecting a customer network to the fabric 318 and an attachment circuit connecting the service peering exchange 301 to the fabric 318. Each virtual circuit 324 may include at least one tunnel (e.g., an LSP and/or Generic Route Encapsulation (GRE) tunnel) having endpoints at PEs 302, 304. PEs 302, 304 may establish a full mesh of tunnels interconnecting one another.

Each virtual circuit 324 may be implemented using a different hub-and-spoke network configured in IP/MPLS network 301 having PE routers 302, 304A exchanging routes using a full or partial mesh of border gateway protocol peering sessions, in this example a full mesh of Multiprotocol Interior Border Gateway Protocol (MP-iBGP) peering sessions. MP-iBGP or simply MP-BGP is an example of a protocol by which routers exchange labeled routes to implement MPLS-based VPNs. However, PEs 302, 304 may exchange routes to implement IP-VPNs using other techniques and/or protocols.

In the example of virtual circuit 324A, PE 304A may associate a route for reaching service peering exchange with a hub-and-spoke network, which may have an associated VRF, that includes spoke PE router 302A. PE 304A then exports the route to PE router 302A; PE router 304A may export the route specifying PE router 304A as the next hop router, along with a label identifying the hub-and-spoke network. PE router 302A sends the route to PE router 309B via a routing protocol connection with PE 309B. PE router 302A may send the route after adding an autonomous system number of the cloud exchange point 303 (e.g., to a BGP autonomous system path (AS_PATH) attribute) and specifying PE router 302A as the next hop router. Cloud exchange point 303 is thus an autonomous system "hop" in the path of the autonomous systems from customers 308 to cloud service providers 320 (and vice-versa), even though the cloud exchange point 303 may be based within a data center. PE router 310B installs the route to a routing database, such as a BGP routing information base (RIB) to provide layer 3 reachability to service peering exchange 301. In this way, cloud exchange point 303 "leaks" routes from for service peering exchange 301 to customer networks 308, without service peering exchange 301 and customer networks 308 requiring a direct layer peering connection.

PE routers 309B, 302A, and 304A may perform a similar operation in the reverse direction to forward routes originated by customer network 308B to PE 304A and thus provide connectivity from service peering exchange 301 to customer network 308B. In the example of virtual circuit 324A, PE routers 309A, 304A, and 302A exchange routes for customer network 308A and service peering exchange 301 in a manner similar to that described above for establishing virtual circuit 324B. As a result, cloud exchange point 303 within data center 300 may internalize the peering connections that may otherwise be established between a network device for service peering exchange 301 and each of PEs 309A, 309B so as to perform aggregation for services provided by service peering exchange 301 to multiple customer network 308, via a single access ink 322 to the cloud exchange point 303. Absent the techniques described herein, fully interconnecting customer networks 308 and service peering exchange 301 would require peering connections between each of PEs 309, CE 311 and a network device for service peering exchange 301. With the techniques described herein, cloud exchange point 303 may fully interconnect customer networks 308 and service peering exchange 301 with one peering connection per site edge device (i.e., for each of PEs 309, CE 311 and the network device for service peering exchange 301) by internalizing the layer 3 peering and providing data center-based 'transport' between access interfaces.

In examples in which IP/MPLS fabric 318 implements BGP/MPLS IP-VPNs or other IP-VPNs that use route targets to control route distribution within the IP backbone, PE 304A may be configured to import routes from PEs 302 and to export routes for service peering exchange 301, using different asymmetric route targets. Likewise, PEs 302 may be configured to import routes from PE 304A and to export routes received from PEs 309, CE 311 using the asymmetric route targets. Thus, PEs 302, 304A may be configured to implement advanced L3VPNs that each includes a basic backbone L3VPN of IP/MPLS fabric 318 together with extranets of any of customer networks 308 and service peering exchange 301 attached to the basic backbone L3VPN. Each advanced L3VPN constitutes a cloud service delivery network from service peering exchange 301 to one or more customer networks 308, and vice-versa. In this way, cloud exchange point 303 enables service peering exchange 301 to exchange service traffic with any customer network 308 while internalizing the layer 3 routing protocol peering connections that would otherwise be established between pairs of customer networks 308 and a network for service peering exchange 301 for a service connection between a given pair. In other words, the cloud exchange point 303 allows each of customer networks 308 and a service peering exchange 301 network to establish a single (or more for redundancy or other reasons) layer 3 routing protocol peering connection to the data center-based layer 3 interconnection. By filtering routes from the network for service peering exchange 301 to customer networks 308, and vice-versa, PEs 302, 304A thereby control the establishment of virtual circuits 324 and the flow of associated service traffic between customer networks 308 and service peering exchange 301 within a data center 300. Routes distributed into MP-iBGP mesh 318 may be VPN-IPv4 routes and be associated with route distinguishers to distinguish routes from different sites having overlapping address spaces.

Additional details of an example interconnection platform and programmable network platform for configuring a cloud exchange point are described in U.S. patent application Ser. No. 15/001,766, filed Jan. 20, 2016, and entitled "MULTI-CLOUD, MULTI-SERVICE DATA MODEL"; and U.S. patent application Ser. No. 14/927,451, filed Oct. 29, 2015, entitled "INTERCONNECTION PLATFORM FOR REAL-TIME CONFIGURATION AND MANAGEMENT OF A CLOUD-BASED SERVICES EXCHANGE"; the entire content of each of which is incorporated by reference herein. A customer of the provider of cloud exchange point 303 and associated with customer network 308A may request an interconnection, such as a virtual circuit, with the service peering exchange 301 using a customer portal 330 or by invoking one or more APIs of the programmable network platform 328 for requesting a virtual circuit. In response, the programmable network platform 328 configures the virtual circuit 324A to create the virtual circuit 324A. Customer network 308A subsequently communicates with service peering exchange 301 using virtual circuit 324A.

Service peering exchange 301 exposes service exchange endpoints 306A-306C reachable from cloud exchange point 303 via access link 322 with PE 304A. Service peering exchange endpoints 306 are also reachable from any customer network 308 coupled to the cloud exchange point 303 and having a virtual circuit 324 for an interconnection with service peering exchange 301. Service exchange endpoints 306 may represent example instances of service exchange endpoints 106. Service peering exchange 301 stores configuration data in the form of a service map 320 that maps service exchange endpoints 306 to respective service endpoints 314 for accessing applications 310 via service gateways 312. For example, service map 320 may map service exchange endpoint 306A to service endpoint 314A, map service exchange endpoint 306B to service endpoint 314B, and map service exchange endpoint 306C to service endpoint 314C. Service map 320 may represent an associative data structure, such as a table, map, or dictionary.

Service peering exchange 301 receives service requests from cloud exchange point 303 via access link 322 and determines corresponding destination service endpoints 314 for the service requests using the service map 320. In the example of FIG. 2B, application 310 originates a service request 325A destined for service exchange endpoint 306B. Customer network 308A outputs the service request 325A to cloud exchange point 303 via access link 316A on virtual circuit 324A. Cloud exchange point 303 forwards the service request 325A using virtual circuit 324A to service peering exchange 301, which receives service request 325 via access link 322.

Service peering exchange 301 receives service request 325A at service exchange endpoint 306B. Service peering exchange 301 queries service map 320, using the service exchange endpoint 306B information as a lookup key, to determine the service endpoint mapped to service exchange endpoint 306B. Service peering exchange 301 generates a new service request 325A' from service request 325A. Service request 325A' includes service data from service request 325A and includes a layer 4 header and a layer 3 header that causes the outgoing service request 124A' to be received at service endpoint service endpoint 314B exposed by service gateway 312B. For example, service peering exchange 301 may rewrite at least the destination network address and destination port of the service request 325A, which is destined to service exchange endpoint 306A, to generate and output service request 325A', which is destined to service endpoint 314B. Service peering exchange 301 may also generate the service request 325A' to have a source service endpoint as service exchange endpoint 306A mapped by service peering exchange 301 to service endpoint 314A of service gateway 312A for the application 310A that originated service request 325A.

Service peering exchange 301 outputs the service request 325A' via access link 322. Cloud exchange point 303 determines service request 325A' is destined for service endpoint 314B and is to be forwarded using virtual circuit 324B. Service peering exchange 301 may output the service request 325A' on a VLAN or other attachment circuit for an IP-VPN or other virtual network with customer network 308B. Cloud exchange 303 may forward the service request 325A' using virtual circuit 324B based in part on the attachment circuit on which PE 304A receives the service request 325A'. Customer network 308B receives the service request 325A' from cloud exchange point 303 via access link 316B Service gateway 312B receives the service request 325A' at the service endpoint 314B. Service gateway 312B sends at least the service data from the service request 325A' to application 310B for processing.

Service peering exchange 301 may proxy a transport-layer (e.g., TCP) session between service peering exchange 301 and a service instance of application 310A and a transport-layer session between service peering exchange 301 and a service instance of application 310B. Service peering exchange 301 may also proxy connectionless communications (e.g., UDP) between service peering exchange 301 and a service instance of application 310A and connectionless communications between service peering exchange 301 and a service instance of application 310B. In this way, service peering exchange 301 creates a service-to-service path between a service instance for application 310A and a service instance for application 310B, despite customer networks 108A, 108B not having network connectivity with one another, at least via cloud exchange point 303. The service instance for application 310A and the service instance for application 310B may exchange service traffic via the service-to-service path that includes service peering exchange 301.

Service peering exchange 301 may in some cases apply policies to control direct bridging (layer 2 forwarding) of service requests between service endpoints 314 for corresponding applications 310. In such cases, service peering exchange may avoid service-level mapping and proxying where service gateways 312 have network reachability to one another via service peering exchange 301. For instance, a service request originated by application 310A and specifying service endpoint 314C may be received at service peering exchange 301 operating as a network bridge to customer network 308C. Service peering exchange 301 applies policies 332, as described below, to determine whether the service request is allowed. If so, service peering exchange 301 forwards the service request to service endpoint 314. If not, service peering exchange 301 drops the service request.

In some examples, as part of routing service requests, the service peering exchange may orchestrate sessions to provision service chains for services.

Policies 332 enable service segmentation among applications 310 executing by customer networks 308. That is, service peering exchange 301 determines, based on policies 332, those sets (e.g., pairs) of applications 310 for which service peering exchange 301 will provide a service-to-service path by delivering service requests and service responses to one another. In this way, policies 332 prevent service peering exchange 301 from providing visibility into service traffic by service gateways 312 other than for service traffic directed to each service gateway. In addition, each service gateway 312 may only be allowed to make service requests to other service gateways 312 as permitted by policies 332. An administrator or operator for service peering exchange 301 may also configure policies 332. Policies 332 may further specify an allowable frequency, amount, dates and times, or other properties of one or more service requests between a pair of service gateways 312. In this way, service peering exchange 301 that applies policies 332 operates as a mediator between applications 310 to secure and control service flows. In some examples, customer portal 330 provides self-service automation to customers for configuring policies 332. In some examples, a configuration API is exposed by service peering exchange 301 to provide self-service automation to customers for configuring policies 332.

For example, customer portal 330 represents an application that may provide a user interface for customers to configure operations for service peering exchange 301, in particular to configure service map 320 and policies 332. Customer portal 330 may provide a web interface or other graphical user interface accessible via a website, for configuring policies 332. One or more computing devices, such as real servers, execute customer portal 330. An operator for service peering exchange 301 may also use a customer portal 330 to configure service map 320 and policies 332.

Policies 332 may include policies for security, mediation, routing, service transformation, load balancing, and service throttling, for example. Policies 332 may be customer-specific (i.e., established for a particular customer, or global). Security policies include policies for authentication, authorization, validation, and encryption, for instance. For example, policies 332 may require that service peering gateway 301 authorize service requests using credentials or previously-obtained login tokens, using a security protocol such as OAuth 2.0, X.509, Kerberos, or a username and password. Security policies may also determine whether a user, service instance, or service gateway 312 of one of customer networks 308 is authorized to issue service requests to a service gateway 312 (or service endpoint 314) of another one of customer networks 308. Application of policies 332 for load balancing may include dynamically mapping service names to service destinations that are instances of a gateway pool.

Offloading the application of policies from service gateways 312 or, more broadly, from customer networks 308, may provide the technical advantage of improving the value and/or scalability of services in the overall network. For example, rather than each service gateway 312 applying security services, such as distributed denial of service (DDoS) protection for the service gateway, service peering exchange 301 may apply the DDoS protection for the various service gateways. Other services may include throttling, validating, other security services, mediation, load balancing, and routing. This technical advantage may be particularly advantageous for small-scale customers that are unable to invest significant resources into network infrastructure.

Routing policies of policies 332 cause service peering exchange 301 to direct matching service requests to particular target service endpoints. While illustrated as a separate data structure, service map 320 may in some instances be realized using policies 332. Routing policies may match service requests based on application data therein, the originator of the service request, and the destination service exchange endpoint 306, for example. Service throttling policies of policies 332 may throttle service requests to a customer based on the service, the originator of the service requests, or other criteria. Load balancing may be applied by the service gateways 312 for service requests received at service endpoints 314.

Although described with respect to service peering exchange 301 of FIGS. 2A-2B, policies 332 may be applied by other service peering exchanges described in this disclosure.

Service map 320 maps service exchange endpoints 306 to respective service endpoints 314 for accessing, from customer networks 308, remote applications 310 via service gateways 312. As noted above, service map 320 may be realized using routing policies of policies 332.

In the example of FIG. 2B, service peering exchange 301 may apply policies 332 to authenticate and/or authorize service gateway 312A or application 310A to send service requests to service endpoint 314 via service exchange endpoint 306B. Service peering exchange 301 may return an authorization token to the authorized entity. Service request 325A may include an authorization token or other credential. Service peering exchange 301 may apply policies 332 and service map 320 to service request 325A received at service exchange endpoint 306B to authorize, throttle, a route a representation of service request 325A to service endpoint 314B as service request 325A'.

Figure 3:
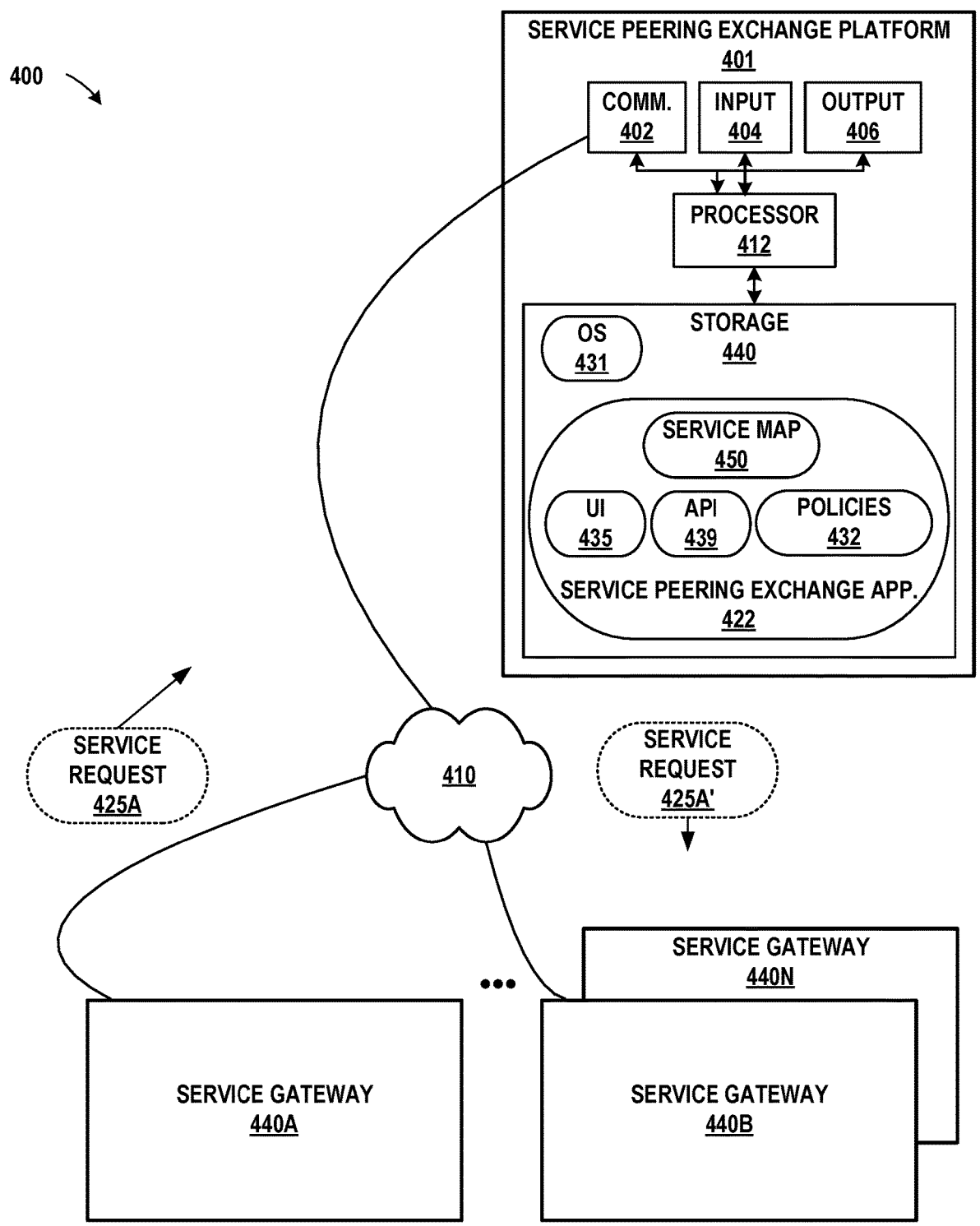
FIG. 3 is a block diagram illustrating an example service exchange system, according to techniques of this disclosure.

FIG. 3 is a block diagram illustrating an example service exchange system, according to techniques of this disclosure. Service exchange system 400 includes a service peering exchange platform 401 in communication with an exchange 410, as well as multiple service gateways 440A-440N in communication with the exchange 410. Exchange 410 may represent an Internet exchange, an Ethernet exchange, or a cloud exchange, such as cloud exchange point 303, which may be managed by a data center provider for a data center in which customer networks for service gateways 440 are co-located to exchange network traffic with other customer networks.

Service peering exchange platform 401 may provide a service peering exchange as described in FIGS. 1, 2A, 2B. Service peering exchange 401 may represent a real or virtual server or a cluster of real or virtual servers and/or networking devices communicatively coupled using network. Service peering exchange 401 may be hosted on a public, private, or hybrid cloud. Service peering exchange platform 401 may include one or more communication units 402, one or more input devices 404, and one or more output devices 406. Service peering exchange platform 401 includes one or more processors 412 and one or more storage devices 440. The one or more storage devices 440 include operating system 431 and service peering exchange application 422. One or more of the devices, modules, storage areas, or other components of service peering exchange platform 401 may be interconnected to enable inter-component communications (physically, communicatively, and/or operatively). In some examples, such connectivity may be provided by through system bus, a network connection, an inter-process communication data structure, or any other method for communicating data. The service peering exchange application 422 may be executed in a distributed manner by multiple servers, of which service peering exchange platform 401 is an example. The servers executing service peering exchange application 422 may include one or more of bare metal servers, virtual machines, containers, or other execution environments.

One or more input devices 404 of service peering exchange platform 401 may generate, receive, or process input. Such input may include input from a keyboard, pointing device, voice responsive system, video camera, button, sensor, mobile device, control pad, microphone, presence-sensitive screen, network, or any other type of device for detecting input from a human or machine.

One or more output devices 406 of service peering exchange platform 401 may generate, transmit, or process output. Examples of output are tactile, audio, visual, and/or video output. Output devices 406 may include a display, sound card, video graphics adapter card, speaker, presence-sensitive screen, one or more USB interfaces, video and/or audio output interfaces, or any other type of device capable of generating tactile, audio, video, or other output. Output devices 406 may include a display device, which may function as an output device using technologies including liquid crystal displays (LCD), quantum dot displays, dot matrix displays, light emitting diode (LED) displays, organic light-emitting diode (OLED) displays, cathode ray tube (CRT) displays, e-ink, or monochrome, color, or any other type of display capable of generating tactile, audio, and/or visual output.

One or more communication units 402 of service peering exchange platform 401 may communicate with devices external to service peering exchange platform 401 by transmitting and/or receiving data, and may operate, in some respects, as both an input device and an output device. In some examples, communication units 402 may communicate with other devices over a network, including with service gateways 440 via exchange 410. In other examples, communication units 402 may send and/or receive radio signals on a radio network such as a cellular radio network. In other examples, communication units 402 of service peering exchange platform 401 may transmit and/or receive satellite signals on a satellite network such as a Global Positioning System (GPS) network. Examples of communication units 402 include a network interface card (e.g. such as an Ethernet card), an optical transceiver, a radio frequency transceiver, a GPS receiver, or any other type of device that can send and/or receive information. Other examples of communication units 402 may include Bluetooth®, GPS, 3G, 4G, and Wi-Fi® radios found in mobile devices as well as Universal Serial Bus (USB) controllers and the like.

One or more processors 412 of service peering exchange platform 401 may implement functionality and/or execute instructions. Examples of processors 412 include microprocessors, application processors, display controllers, auxiliary processors, one or more sensor hubs, and any other hardware configured to function as a processor, a processing unit, a processing device, or processing circuitry. Service peering exchange platform 401 may use one or more processors 412 to perform operations in accordance with one or more aspects of the present disclosure using software, hardware, firmware, or a mixture of hardware, software, and firmware stored by and/or executing at service peering exchange platform 401.

One or more storage devices 420 may store information for processing during operation of service peering exchange platform 401. In some examples, one or more storage devices 420 are temporary memories, meaning that a primary purpose of the one or more storage devices is not long-term storage. Storage devices 420 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 420, in some examples, also include one or more computer-readable storage media. Storage devices 420 may be configured to store larger amounts of information than volatile memory. Storage devices 420 may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories. Storage devices 420 may store program instructions and/or data associated with one or more of the modules described in accordance with one or more aspects of this disclosure.

One or more processors 412 and one or more storage devices 420 may provide an operating environment or platform for one or more modules, which may be implemented as software, but may in some examples include any combination of hardware, firmware, and software. One or more processors 412 may execute instructions and one or more storage devices 420 may store instructions and/or data of one or more modules. The combination of processors 412 and storage devices 420 may retrieve, store, and/or execute the instructions and/or data of one or more applications, modules, or software. Processors 412 and/or storage devices 420 may also be operably coupled to one or more other software and/or hardware components, including, but not limited to, one or more of the components illustrated in FIG. 3.

One or more modules or applications illustrated in FIG. 3 as being included within storage devices 420 (or modules otherwise described herein) may perform operations described using software, hardware, firmware, or a mixture of hardware, software, and firmware residing in and/or executing at service peering exchange platform 401. Service peering exchange platform 401 may execute each of the module(s) with multiple processors or multiple devices. Service peering exchange platform 401 may execute one or more of such modules natively, or as a virtual machine or container executing on underlying hardware. One or more of such modules may execute as one or more services of an operating system 431 or computing platform. One or more of such modules may execute as one or more executable programs at an application layer of an operating platform provided by operating system 431.

User interface module 435 may manage user interactions with one or more user interface devices, which may include one or more of input devices 404 and one or more of output devices 406. In some examples, service peering exchange platform 401 may include a presence-sensitive display that may serve as a user interface device and that may be considered both an input device 404 and an output device 406. In some examples, user interface module 435 may act as an intermediary between various components of service peering exchange platform 401 to make determinations based on user input detected by one or more user interface devices and/or one or more input devices 404 and generate output at a user interface device or one or more output devices 406.

User interface module 435 may receive instructions from an application, service, platform, or other module of service peering exchange platform 401 to cause a user interface device (e.g., presence-sensitive display) to output a user interface. User interface module 435 is illustrated as a module of the service peering exchange application 422, but user interface module 436 may often be or execute a sub-component of an operating system controlling operation of service peering exchange platform 401, and user interface module 435 may alternatively or also be a stand-alone application, service, or module executing at service peering exchange platform 401. User interface module 435 may manage inputs received by service peering exchange platform 401 as a user views and interacts with a user interface presented and update the user interface in response to receiving additional instructions from the application, service, platform, or other module of service peering exchange platform 401 that is processing the user input. As further described below, user interface module 435 may output a portal and receive input data (e.g., exchange rate data) from input devices 404 accessible by a customer or administrator of service peering exchange platform 401 to specify and/or manipulate policies 432.

Storage devices 420 may include an operating system 431 and a service peering exchange application 422 for performing operations related to providing a service peering exchange for exchanging service requests among service gateways 440. Service peering exchange application 422 may interact with and/or operate in conjunction with one or more modules of service peering exchange platform 401. Service peering exchange application 422 may listen for network packets at service exchange endpoints of service peering exchange platform 401. Operation system 431 may execute a networking stack and deliver network packets destined for the service exchange endpoints to service peering exchange application 422. A service request may be included in one or more network packets. Each service exchange endpoint is a combination of a network-layer (L3) address and a transport-layer (L4) port for service peering exchange platform 401.

A user may invoke user interface 436 or application programming interface 439 for service peering exchange application 422 to configure policies 432. Policies 432 may represent example instances of policies 332. Communication units 402 may receive service endpoint data describing one or more service endpoints for one or more service endpoints. The one or more processors 412 executing service peering exchange application 422 processes the service endpoint data, requests service exchange endpoints from operating system 431, and maps the service exchange endpoints to corresponding service endpoints indicated by the service endpoint data. The processors 412 generate service map 450 for the mappings of the service exchange endpoints to the service endpoints, and vice-versa. With these example operations, service peering exchange application 422 enables service peering exchange platform 401 to operate as an application services fabric that performs service routing among service endpoints. The application services fabric may extend across one or more real and/or virtual computing and/or networking devices that constitute service peering exchange platform 401.

Service peering exchange platform 401 receives a service request 425A from a customer network associated with service gateway 440A, via communication unit 402 and network exchange 410. The service request 425A is destined for a service exchange endpoint of service peering exchange 401. Service request 425A may represent an example instance of any of the service requests described this disclosure. Operating system 431 delivers service request 425A to service peering exchange application 422, which listens on the service exchange endpoint, for processing. Service request 425A may arrive as one or more packets.

In accordance with one or more aspects of the present disclosure, the one or more processors 412 executing service peering exchange application 422 process the service request 425A by applying policies 332 to output a representation of the service request 425A to a service endpoint of service gateway 440B. Processors 412 apply service map 450 to map the destination service exchange endpoint of service request 425A to a service endpoint of service gateway 440B. A service map 450 may match on the destination network address and destination port of one or more packets of the service request 425A and specify a destination endpoint of service gateway 440B. In response, processors 412 generate service request 425A' having a destination network address and destination port that are the specified destination endpoint of service gateway 440B. Processors 412 may generate service request 425A' to have a source network address and source port that is a service exchange endpoint of service peering exchange platform 401. In this way, service peering exchange platform 401 impersonates service gateway 440A to service gateway 440B. Processors 412 output, via communication unit 402, the service request 425A' for delivery via network exchange 410.

Figure 4:
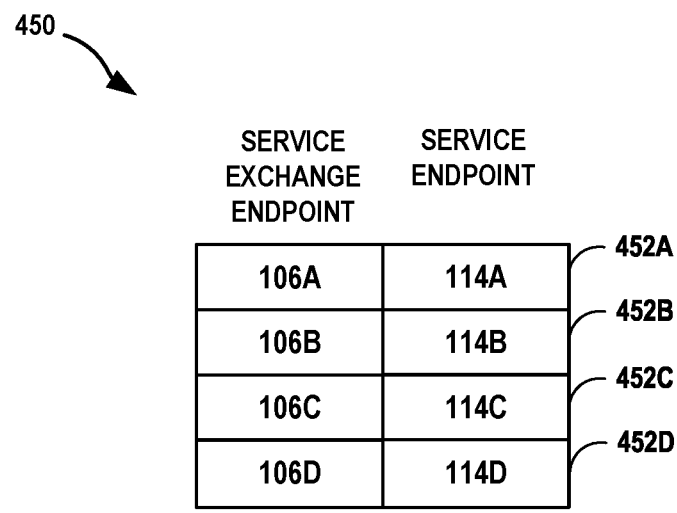
FIG. 4 is an example service map, according to techniques of this disclosure.

FIG. 4 is an example service map, according to techniques of this disclosure. Service map 450 is an associative data structure having multiple entries 452A-452D that each maps a service exchange endpoint of a service peering exchange to a service endpoint for an application, such as a service endpoint exposed by a service gateway, and vice-versa. For example, entry 452A maps service exchange endpoint 106A to service endpoint 114A. Service map 450 may store each service endpoint and service exchange endpoint as combinations of a network address and transport-layer port. Service map 450 may include a hash table such that entries 452 are hash buckets having hash values corresponding to values of a hash function applied to the service endpoint or service exchange endpoints, with the hash value of a service exchange endpoint being mapped to the service endpoint and the hash value of a service endpoint being mapped to a service exchange endpoint. Example hash functions include SHA-1 and MD5.

Figure 5:
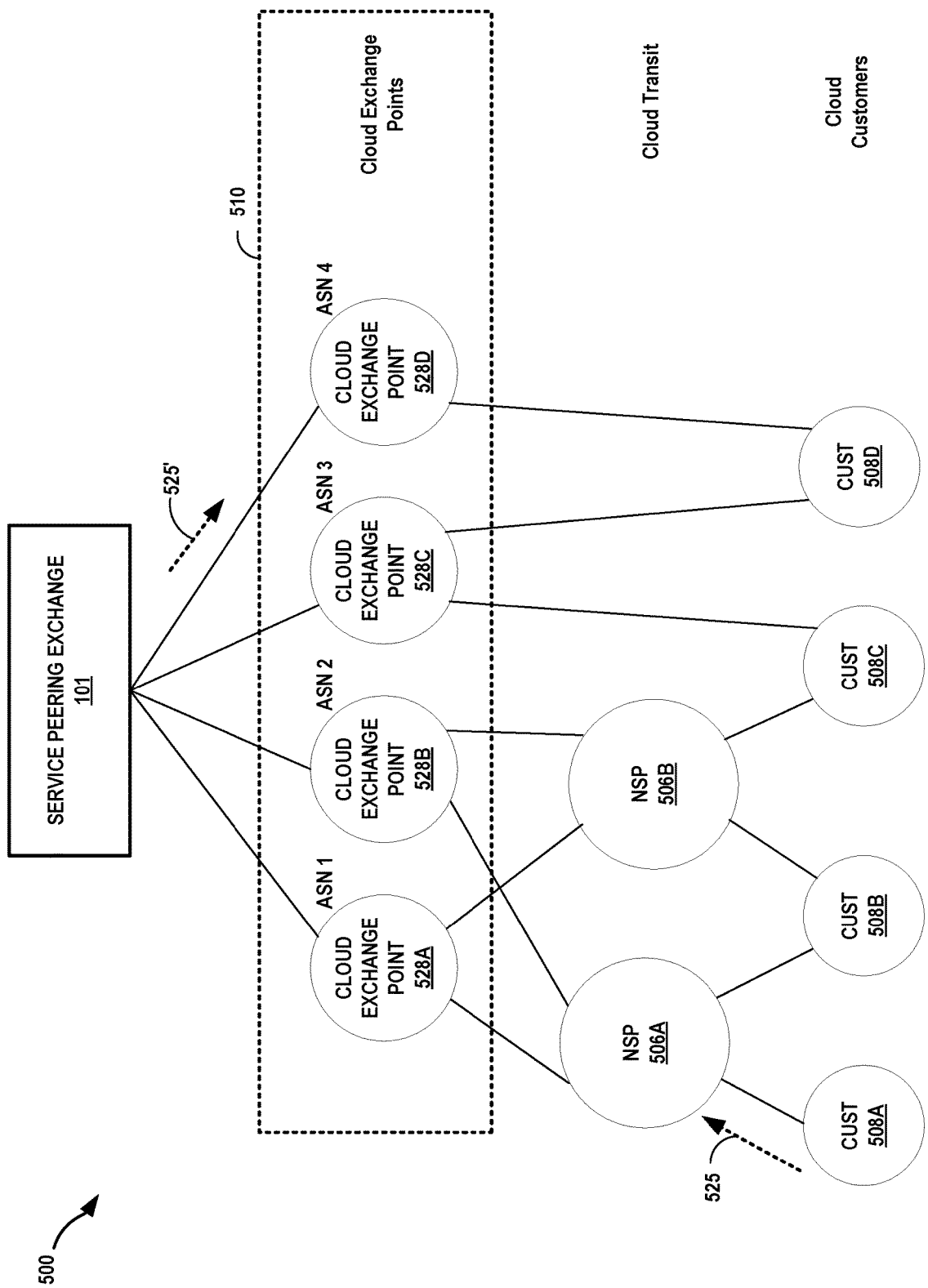
FIG. 5 is a block diagram that illustrates a conceptual view of a service exchange system having a metro-based cloud exchange that provides multiple cloud exchange points for communication with a service peering exchange, according to techniques described herein.

FIG. 5 is a block diagram that illustrates a conceptual view of a service exchange system having a metro-based cloud exchange that provides multiple cloud exchange points for communication with a service peering exchange, according to techniques described herein. Each of cloud-based services exchange points 528A-528D (described hereinafter as "cloud exchange points" and collectively referred to as "cloud exchange points 528") of cloud-based services exchange 510 ("cloud exchange 510") may represent a different data center geographically located within the same metropolitan area ("metro-based," e.g., in New York City, N.Y.; Silicon Valley, Calif.; Seattle-Tacoma, Wash.; Minneapolis-St. Paul, Minn.; London, UK; etc.) to provide resilient and independent cloud-based services exchange by which cloud-based services customers ("cloud customers") and cloud-based service providers ("cloud providers") (not shown in FIG. 5) connect to receive and provide, respectively, cloud services. In various examples, cloud exchange 510 may include more or fewer cloud exchange points 528. In some instances, a cloud exchange 510 includes just one cloud exchange point 528. As used herein, reference to a "cloud exchange" or "cloud-based services exchange" may refer to a cloud exchange point. A cloud exchange provider may deploy instances of cloud exchanges 510 in multiple different metropolitan areas, each instance of cloud exchange 510 having one or more cloud exchange points 528.

Each of cloud exchange points 528 includes network infrastructure and an operating environment by which customers 508A-508D (collectively, "cloud customers 508") exchange service requests and service responses via service peering exchange 101. Each of customers 508 may have one or more service peering gateways (not shown in FIG. 5). Cloud customers 508 may exchange service requests and service responses directly via a layer 3 peering and physical connection to one of cloud exchange points 528 or indirectly via one of network service providers 506A-506B (collectively, "NSPs 506," or alternatively, "carriers 506"). NSPs 506 provide "cloud transit" by maintaining a physical presence within one or more of cloud exchange points 528 and aggregating layer 3 access from one or customers 508. NSPs 506 may peer, at layer 3, directly with one or more cloud exchange points 528 and in so doing offer indirect layer 3 connectivity and peering to one or more customers 508 by which customers 508 may obtain cloud services from the cloud exchange 500.

Each of cloud exchange points 528, in the example of FIG. 5, may be assigned a different autonomous system number (ASN). For example, cloud exchange point 528A is assigned ASN 5, cloud exchange point 528B is assigned ASN 2, and so forth. Each cloud exchange point 528 is thus a next hop in a path vector routing protocol (e.g., BGP) path from service peering exchange 101 to customers 508. As a result, each cloud exchange point 528 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more cloud service providers 550 to customers. In other words, cloud exchange points 528 may internalize the eBGP peering relationships that cloud service providers 550 and customers 508 would maintain on a pair-wise basis. Instead, a customer 508 may configure a single eBGP peering relationship with a cloud exchange point 528 and receive, via the cloud exchange, multiple cloud services from one or more cloud service providers 550. While described herein primarily with respect to eBGP or other layer 3 routing protocol peering between cloud exchange points and customer, NSP, or cloud service provider networks, the cloud exchange points may learn routes from these networks in other way, such as by static configuration, or via Routing Information Protocol (RIP), Open Shortest Path First (OSPF), Intermediate System-to-Intermediate System (IS-IS), or other route distribution protocol. Each of cloud exchange points 528 may represent an example instance of cloud exchange point 303.

As examples of the above, customer 508D is illustrated as having contracted with a cloud exchange provider for cloud exchange 500 to directly access layer 3 cloud services via cloud exchange points 528C, 528D. In this way, customer 508D receives redundant layer 3 connectivity to cloud service provider 550A, for instance. Customer 508C, in contrast, is illustrated as having contracted with the cloud exchange provider for cloud exchange 500 to directly access layer 3 cloud services via cloud exchange point 528C and also to have contracted with NSP 506B to access layer 3 cloud services via a transit network of the NSP 506B. Customer 508B is illustrated as having contracted with multiple NSPs 506A, 506B to have redundant cloud access to cloud exchange points 528A, 528B via respective transit networks of the NSPs 506A, 506B. The contracts described above are instantiated in network infrastructure of the cloud exchange points 528 by L3 peering configurations within switching devices of NSPs 506 and cloud exchange points 528 and L3 connections, e.g., layer 3 virtual circuits, established within cloud exchange points 528 to interconnect cloud service provider 550 networks to NSPs 506 networks and customer 508 networks, all having at least one port offering connectivity within one or more of the cloud exchange points 528.

As one example, customer 508A issues a service request 525 to a service exchange point exposed by service peering exchange 101. NSP 506A transports the service request 525 to cloud exchange point 528A, which delivers the service request 525 to service peering exchange 101 using a virtual circuit between NSP 506A and service peering exchange 101.

Service peering exchange 101 maps the service exchange endpoint that is a destination of service request 525 to a service endpoint at customer 508D. Service peering exchange 101 generates a new service request 525' that includes service data from the service request 525, and outputs the service request 525' to customer network 508D. Cloud exchange point 528D delivers the service request 525' to customer network 508D using a virtual circuit between service peering exchange 101 and customer network 508D.

Figure 6:
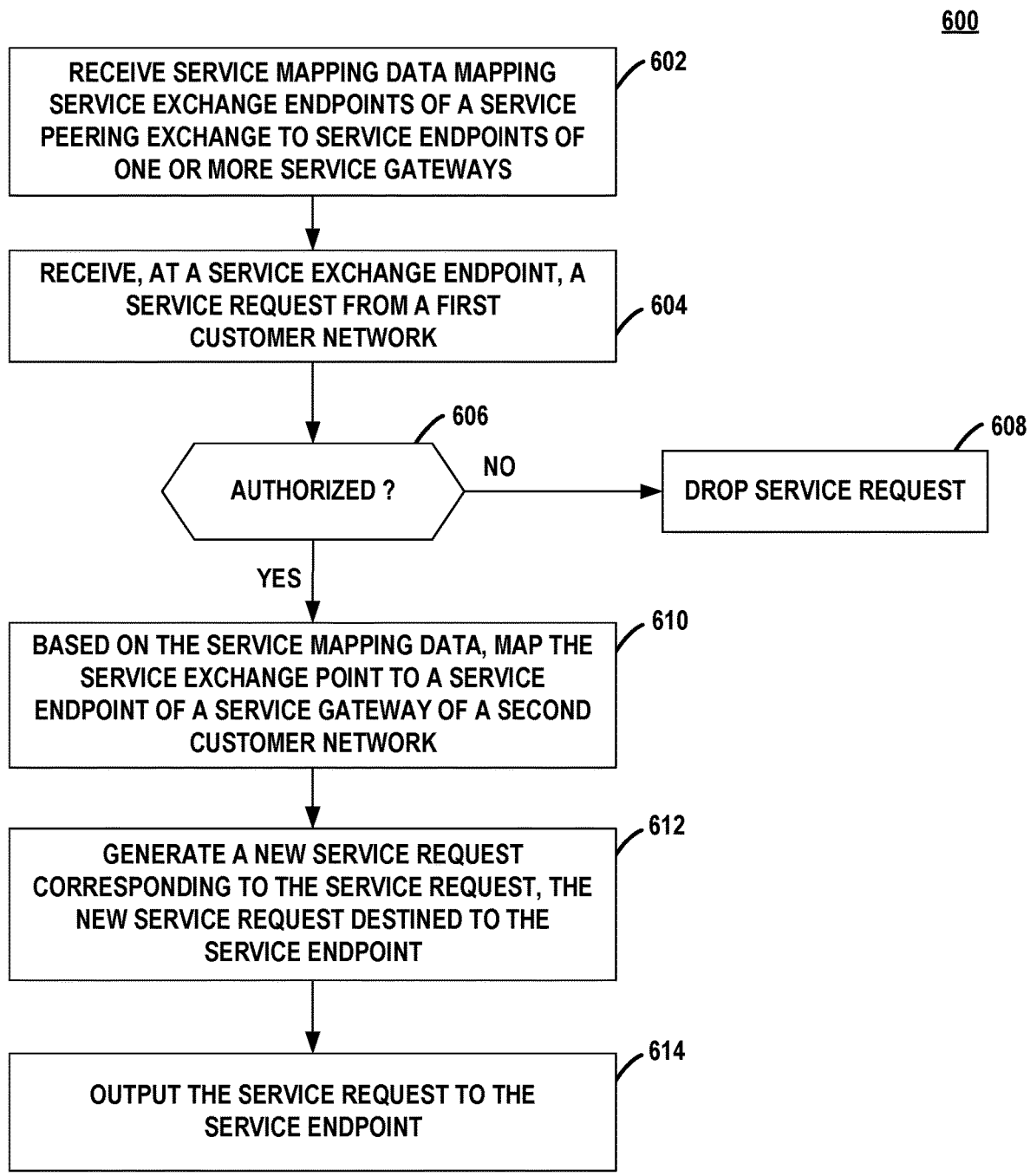
FIG. 6 is a flowchart illustrating an example mode of operation for a service peering exchange, according to techniques of this disclosure.

FIG. 6 is a flowchart illustrating an example mode of operation 600 for a service peering exchange, according to techniques of this disclosure. FIG. 6 is described for purposes of example with respect to service peering exchange 101 of FIG. 1, but the operation may be performed by any service peering exchange described in this disclosure. Service peering exchange 101 receives service mapping data that maps service exchange endpoints 106 to service endpoints of service gateways 112 of customer networks 108 (602). Service peering exchange 101 may store the service mapping data as a service map or as one or more policies.

Service peering exchange 101 receives an incoming service request 124A that is output by a device of customer network 108A and that is destined to a service exchange endpoint 106C of the service peering exchange 101 (604). Service peering exchange 101 determines whether the service request 124A is authorized for the service exchange endpoint 106C (606). If the service request 124A is not authorized (NO branch of 608), service peering exchange 101 drops the service request 124A (608). For example, service peering exchange 101 may not respond or take no action with respect to service request 124A or may reply with an error message. If the service request 124A is authorized (YES branch of 608), service peering exchange 101 routes the service request.

To route the service request, service peering exchange 101 maps the service exchange endpoint 106C to service endpoint 114C of service gateway 112C based on the service mapping data (610). Service peering exchange 101 generates a new outgoing service request 124A' (or rewrites header data for the service request 124A to form new outgoing service request 124A') that is destined to service endpoint 114C mapped at step 610 (612). Service peering exchange 101 outputs the outgoing service request 124A' on a communication link 103C with customer network 108C (614).

Figure 7:
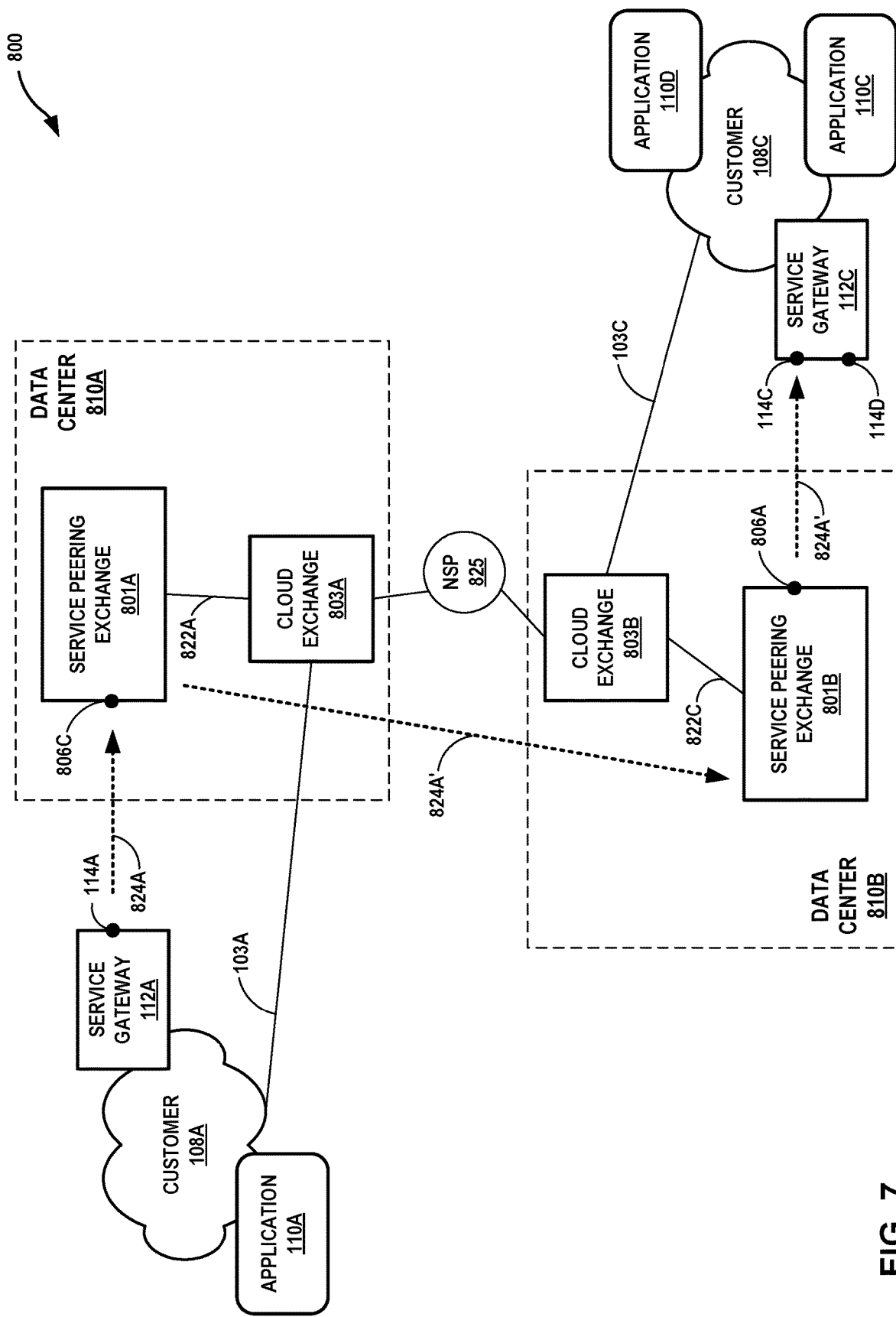
FIG. 7 is a block diagram illustrating an example of distributed service exchange system, according to techniques described herein.

FIG. 7 is a block diagram illustrating an example of distributed service exchange system, according to techniques described herein. System 800 includes multiple geographically distributed data centers 810A-810B ("data centers 810") connected via a communication link over network service provider 825. Data centers 810 may be located within a single metropolitan area or located in different metropolitan areas. In this particular example architecture, each of data centers 810 includes a corresponding cloud exchange of cloud exchanges 803A-803B ("cloud exchanges 803"). However, other examples of a distributed service exchange system architecture may be implemented using different types of distributed SDN or SD-WAN architectures. Each of cloud exchanges 803 may be an example instance of cloud exchange point 303. Additional details for distributed cloud exchanges are found in U.S. patent application Ser. No. 15/475,957, filed Mar. 31, 2017 and entitled "Inter-Metro Connectivity Network Connect," which is incorporated by reference herein in its entirety.

System 800 includes multiple distributed service peering exchanges 801A-801B ("service peering exchanges 801") co-located or otherwise having connectivity within respective data centers 810 and executed by a distributed service peering exchange platform. In this particular example architecture, service peering exchange 801A connects to service peering exchange 803A via access link 822A, and service peering exchange 801B connects to service peering exchange 803B via access link 822B. Access links 822 may represent example instances of access link 322. While only two service peering exchanges 801 in two data centers 810 are illustrated in FIG. 7, other examples of system 800 may include more service peering exchanges 801 located in additional, corresponding data centers 810.

Distributed service peering exchanges 801 operate as a distributed service peering exchange to provide service peering exchange services across multiple locations to enable applications executing on customer networks at a local location to access services located at remote locations. Service peering exchanges 801 include shared service exchange endpoints 806 for sending and receiving service traffic with customer networks 108 via access links 822 and communication links 103 via cloud exchanges 803. Service exchange endpoints 806 may be example instances of service exchange endpoints 106.

Service peering exchange 801A includes service exchange endpoint 806C. Service peering exchange includes service exchange endpoint 806A. Service peering exchange 801A receives service request 824A (an example instance of service request 124A) issued by application 110A at service exchange endpoint 806C. Service peering exchange 801A outputs, in response, corresponding outgoing service request 824A' directed to the service endpoint 114C, on a different customer network 108C, to which the destination service exchange endpoints 806A is mapped. In this way, service peering exchanges 801 enable service-to-service communication between applications executing by customer networks 108 that do not have a dedicated, directly network-layer connection with one another and, moreover, are connected to geographically distributed data centers 810.

Distributed service peering exchanges 801 may monitor latencies among the service peering exchanges 801 and expose the latencies via an API method. For example, service gateway 112A may request and receive, via the API method, a latency between service peering exchange 801A and service peering exchange 801B.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A service exchange system comprising:
  a service peering exchange configured for execution by a service peering exchange platform comprising one or more computing devices; and
  a cloud exchange connected via an access link to the service peering exchange platform, wherein the cloud exchange is configured with:
    a first virtual circuit connecting a first customer network to the service peering exchange via the access link; and
    a second virtual circuit connecting a second customer network to the service peering exchange via the access link,
  wherein the service peering exchange is configured to receive, at a service exchange endpoint of the service peering exchange, via the first virtual circuit, an incoming service request destined to the service exchange endpoint, wherein the incoming service request can invoke an application programming interface for an application configured for execution by the second customer network, and
  wherein the service peering exchange is configured to output, in response to receiving the incoming service request, via the second virtual circuit, an outgoing service request destined to a service endpoint of the second customer network, wherein the outgoing service request can invoke the application programming interface of the application configured for execution by the second customer network.

2. The service exchange system of claim 1, wherein the service endpoint of the second customer network comprises a service endpoint of a service gateway.

3. The service exchange system of claim 1,
wherein the service peering exchange is configured to receive service endpoint data describing the service endpoint of the second customer network,
wherein the service peering exchange is configured to generate an association from the service exchange endpoint to the service endpoint of the second customer network, and
wherein the service peering exchange is configured to output the outgoing service request based at least on the association.

4. The service exchange system of claim 1, wherein the first customer network does not have network connectivity with the second customer network.

5. The service exchange system of claim 1,
wherein the application comprises a service instance of a second application,
wherein the incoming service request is originated by a service instance of a first application configured for execution by the first customer network,
wherein the service peering exchange further comprises a policy that specifies whether a service instance of the first application can send a service request to a service instance of the second application, and
wherein the service peering exchange is configured to output, in response to applying the policy to the incoming service request to determine a service instance of the first application can send a service request to a service instance of the second application, the outgoing service request to the service instance of the second application.

6. The service exchange system of claim 5,
wherein the policy specifies at least one of an allowable frequency of service requests or an allowable amount of service requests from the service instance of the first application to the service instance of the second application, and
wherein the service peering exchange is configured to output, in response to applying the policy to the incoming service request to determine the incoming service request does not exceed the at least one of the allowable frequency of service requests or the allowable amount of service requests from the service instance of the first application to the service instance of the second application, the outgoing service request to the service instance of the second application.

7. The service exchange system of claim 1, wherein each of the incoming service request and the outgoing service request comprises one of a Representational State Transfer (REST) communication using HyperText Transfer Protocol (HTTP), a JavaScript Object Notation (JSON)-Remote Procedure Call (RPC), a Simple Object Access Protocol (SOAP) message, an Apache Thrift request, and an eXtensible Markup Language (XML)-RPC, Message Queue Telemetry Transport (MQTT), Rabbit Message Queue (RabbitMQ), or Constrained Application Protocol (CoAP).

8. The service exchange system of claim 1,
wherein the service peering exchange is configured to receive a discovery request that invokes a discovery application programming interface of the service peering exchange and requests a service endpoint for accessing the application programming interface of the application, and
wherein the service peering exchange is configured to output a discovery response responsive to the discovery request, the discovery response indicating the service exchange endpoint is a service endpoint for accessing the application programming interface of the application.

9. The service exchange system of claim 1, wherein the service exchange endpoint comprises a combination of a network layer address and a transport layer port of the one or more computing devices.

10. The service exchange system of claim 1,
wherein the cloud exchange comprises a layer 3 network located within a data center,
wherein the access link comprises a first attachment circuit, for an Internet Protocol-Virtual Private Network configured in the cloud exchange, for communications between the service peering exchange and the first customer network via the first virtual circuit, and
wherein the access link comprises a second attachment circuit, for the Internet Protocol-Virtual Private Network configured in the cloud exchange, for communications between the service peering exchange and the second customer network via the second virtual circuit.

11. A method comprising:
by a service peering exchange executed by a service peering exchange platform comprising one or more computing devices, the service peering exchange platform connected to a cloud exchange via an access link, the cloud exchange configured with a first virtual circuit connecting a first customer network to the service peering exchange via the access link, and a second virtual circuit connecting a second customer network to the service peering exchange via the access link:
receiving, at a service exchange endpoint of the service peering exchange, via the first virtual circuit, an incoming service request destined to the service exchange endpoint, wherein the incoming service request can invoke an application programming interface for an application configured for execution by the second customer network, and
outputting, in response to receiving the incoming service request, via the second virtual circuit, an outgoing service request destined to a service endpoint of the second customer network, wherein the outgoing service request can invoke the application programming interface of the application configured for execution by the second customer network.

12. The method of claim 11, wherein the service endpoint of the second customer network comprises a service endpoint of a service gateway.

13. The method of claim 11, further comprising:
receiving, by the service peering exchange, service endpoint data describing the service endpoint of the second customer network,
generating, by the service peering exchange, an association from the service exchange endpoint to the service endpoint of the second customer network, and
outputting, by the service peering exchange, the outgoing service request based at least on the association.

14. The method of claim 11, wherein the first customer network does not have network connectivity with the second customer network.

15. The method of claim 11,
wherein the application comprises a service instance of a second application,
wherein the incoming service request is originated by a service instance of a first application configured for execution by the first customer network, the method further comprising:
outputting, by the service peering exchange in response to applying a policy to the incoming service request to determine the policy specifies that a service instance of the first application can send a service request to a service instance of the second application, the outgoing service request to the service instance of the second application.

16. The method of claim 15,
wherein the policy specifies at least one of an allowable frequency of service requests or an allowable amount of service requests from the service instance of the first application to the service instance of the second application, the method further comprising:
outputting, by the service peering exchange in response to applying the policy to the incoming service request to determine the incoming service request does not exceed at least one of the allowable frequency of service requests or the allowable amount of service requests from the service instance of the first application to the service instance of the second application, the outgoing service request to the service instance of the second application.

17. The method of claim 11, wherein each of the incoming service request and the outgoing service request comprises one of a Representational State Transfer (REST) communication using HyperText Transfer Protocol (HTTP), a JavaScript Object Notation (JSON)-Remote Procedure Call (RPC), a Simple Object Access Protocol (SOAP) message, an Apache Thrift request, and an eXtensible Markup Language (XML)-RPC, Message Queue Telemetry Transport (MQTT), Rabbit Message Queue (RabbitMQ), or Constrained Application Protocol (CoAP).

18. The method of claim 11, further comprising:
receiving, by the service peering exchange, a discovery request that invokes a discovery application programming interface of the service peering exchange and requests a service endpoint for accessing the application programming interface of the application, the method further comprising:
outputting, by the service peering exchange, a discovery response responsive to the discovery request, the discovery response indicating the service exchange endpoint is a service endpoint for accessing the application programming interface of the application.

19. The method of claim 11,
wherein the cloud exchange comprises a layer 3 network located within a data center,
wherein the access link comprises a first attachment circuit, for an Internet Protocol-Virtual Private Network configured in the cloud exchange, for communications between the service peering exchange and the first customer network via the first virtual circuit, and
wherein the access link comprises a second attachment circuit, for the Internet Protocol-Virtual Private Network configured in the cloud exchange, for communications between the service peering exchange and the second customer network via the second virtual circuit.

20. A non-transitory computer-readable medium comprising instructions for causing processing circuitry of a service peering exchange platform to perform operations comprising:
receiving, by a service peering exchange of the service peering exchange platform, at a service exchange endpoint of the service peering exchange, via a first virtual circuit, an incoming service request destined to the service exchange endpoint, wherein the incoming service request can invoke an application programming interface for an application configured for execution by a second customer network; and
outputting, by the service peering exchange, in response to receiving the incoming service request, via a second virtual circuit, an outgoing service request destined to a service endpoint of the second customer network, wherein the outgoing service request can invoke the application programming interface of the application configured for execution by the second customer network,
wherein the service peering exchange platform is connected to a cloud exchange via an access link, and
wherein the cloud exchange is configured with a first virtual circuit connecting a first customer network to the service peering exchange via the access link and a second virtual circuit connecting a second customer network to the service peering exchange via the access link.

\* \* \* \* \*